United States Patent
Kawakami et al.

(10) Patent No.: US 7,938,344 B2
(45) Date of Patent: *May 10, 2011

(54) MICROPARTICLES, MICROPARTICLE PRODUCTION METHOD, AND MICROPARTICLE PRODUCTION APPARATUS

(75) Inventors: Tomonori Kawakami, Hamamatsu (JP); Mitsuo Hiramatsu, Hamamatsu (JP); Tokio Takagi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1372 days.

This patent is subject to a terminal disclaimer.

(21) Appl. No.: 10/579,755

(22) PCT Filed: Nov. 18, 2004

(86) PCT No.: PCT/JP2004/017187
§ 371 (c)(1),
(2), (4) Date: May 18, 2006

(87) PCT Pub. No.: WO2005/049213
PCT Pub. Date: Jun. 2, 2005

(65) Prior Publication Data
US 2007/0152360 A1    Jul. 5, 2007

(30) Foreign Application Priority Data
Nov. 20, 2003 (JP) .................. P2003-391184

(51) Int. Cl.
*B02C 19/18* (2006.01)
(52) U.S. Cl. .................. 241/1; 241/21; 241/301
(58) Field of Classification Search .............. 241/1, 21, 241/23, 301
See application file for complete search history.

(56) References Cited

U.S. PATENT DOCUMENTS
4,482,375 A  11/1984 Sastry et al.
6,068,800 A   5/2000 Singh et al.
(Continued)

FOREIGN PATENT DOCUMENTS
DE  101 60 817  6/2003
(Continued)

OTHER PUBLICATIONS

Yoshiaki Tamaki et al. "Tailoring nanoparticles of aromatic and dye molecules by excimer laser irradiation." *Applied Surface Science.* (2000) vol. 168, pp. 85-88.

(Continued)

*Primary Examiner* — Faye Francis
(74) *Attorney, Agent, or Firm* — Drinker Biddle & Reath LLP

(57) ABSTRACT

A to-be-treated body, which contains raw material particles 5 of a substance and with which a solvent 4 of a to-be-treated liquid 2 is made solid, is used, and a laser light source 10, which supplies a laser light of a predetermined wavelength to a treatment chamber 3 that contains the to-be-treated body, is provided to arrange a production apparatus 1A. The laser light from the laser light source 10 is illuminated onto the to-be-treated body to microparticulate the substance in solvent 4. As the to-be-treated body of solid form, a solidified body 6, with which water 4 is solidified by a cooling device 50 and the solidified state is maintained by a thermally insulating layer 30, may be used. Or, as the to-be-treated body, a gel body, with which the solvent is gelled, may be used. The substance can thereby microparticulated efficiently by photo-pulverization.

14 Claims, 15 Drawing Sheets

U.S. PATENT DOCUMENTS

Figure 1:
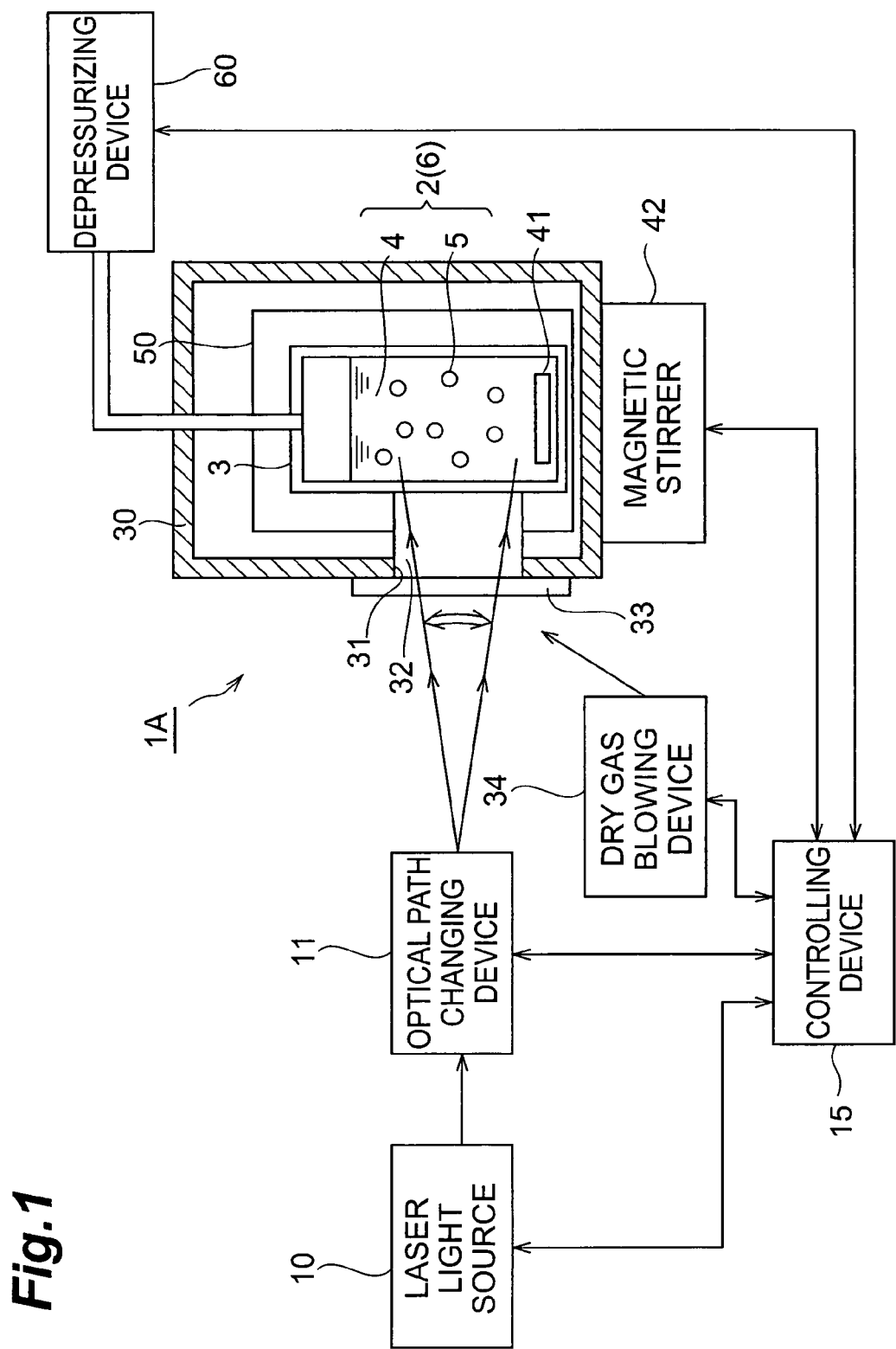

| | | | | |
|---|---|---|---|---|
| 7,597,277 | B2 * | 10/2009 | Kawakami et al. | ............... 241/1 |
| 2008/0265070 | A1 | 10/2008 | Kawakami et al. | |

FOREIGN PATENT DOCUMENTS

| | | |
|---|---|---|
| EP | 1 541 228 | 6/2005 |
| JP | 62-83055 | 4/1987 |
| JP | 4-63135 | 2/1992 |
| JP | 09-313573 | 12/1997 |
| JP | 11-188427 | 7/1999 |
| JP | 2000-153268 | 6/2000 |
| JP | 2001-113159 | 4/2001 |
| JP | 2001-334165 | 12/2001 |
| JP | 2005-125258 | 5/2005 |
| JP | 2005-168495 | 6/2005 |
| WO | 01/08795 | 2/2001 |
| WO | 2004/020086 | 3/2004 |
| WO | 2004/080586 | 9/2004 |
| WO | 2005/049213 | 6/2005 |
| WO | 2005/058480 | 6/2005 |
| WO | 2005/082521 | 9/2005 |
| WO | 2005/092489 | 10/2005 |

OTHER PUBLICATIONS

Yoshiaki Tamaki et al. "Nanoparticle Formation of Vanadyl Phthalocyanine by Laser Ablation of Its Crystalline Powder in a Poor Solvent." *J. Phys. Chem.* A (2002) vol. 106, pp. 2135-2139.

Bo Li et al. Enhancement of organic nanoparticle preparation by laser ablation in aqueous solution using surfactants. *Applied Surface Science.* (2003) vol. 210, pp. 171-176.

Takeshi Sasaki et al. "Preparation of Platinum-Titanium Oxide Composite Particulate by Laser Ablation in Aqueous Solutions." *The Japan Society of Applied Physics 64$^{th}$ Annual Meeting Digest.* (Autumn 2003, Fukuoka University) p. 1032.

Bo Li et al. "Surfactant effects on optical absorption spectra of iron phthalocyanine nanoparticles in water." *Materials Research Bulletin.* 39(2004), pp. 1265-1269.

\* cited by examiner (a)

(b)

(a)

(b)

(a)

(b)

MICROPARTICLES, MICROPARTICLE PRODUCTION METHOD, AND MICROPARTICLE PRODUCTION APPARATUS

TECHNICAL FIELD

The present invention relates to microparticles of an organic compound or other substance and a method and a apparatus for producing microparticles.

BACKGROUND ART

Microparticulation of an organic compound brings about extreme increase of surface area. Microparticulation of an organic compound thus provides a merit that properties unique to the substance are exhibited readily. Also, in a case where particles are of a poorly soluble or insoluble substance, microparticles formed by microparticulation of the particles can be put in a state of pseudo-dissolution in a solvent such as water (a state where the microparticles, although being suspended in the solvent, appear to be pseudo-dissolved due to the lack of light scattering).

As a conventional microparticulation method, there is known the method disclosed in Patent Document 1 (Japanese Patent Application Laid-Open No. 2001-113159). This Publication discloses a method of producing microparticles of an organic compound by illumination by a laser light. With this method, organic pigments and condensed polycyclic aromatic compounds, having properties intermediate to those of inorganic substances and organic substances and having rigid and tough molecular structures, are subjected as organic compounds to microparticulation. Microparticulation of organic compounds by laser light illumination is also described in Non-Patent Documents 1 to 3.

Patent Document 1: Japanese Patent Application Laid-Open No. 2001-113159

Non-Patent Document 1: Y. Tamaki et al., "Tailoring nanoparticles of aromatic and dye molecules by excimer laser irradiation," Applied Surface Science Vol. 168, p. 85-88 (2000)

Non-Patent Document 2: Y. Tamaki et al., "Nanoparticle Formation of Vanadyl Phthalocyanine by Laser Ablation of Its Crystalline Powder in a Poor Solvent," J. Phys. Chem. A 2002, 106, p. 2135-2139 (2002)

Non-Patent Document 3: B. Li et al., "Enhancement of organic nanoparticle preparation by laser ablation in aqueous solution using surfactants," Applied Surface Science Vol. 210, p. 171-176 (2003)

DISCLOSURE OF THE INVENTION

Problems to be Solved by the Invention

Employment of the above-mentioned microparticulation arts provides possibilities of new methods of preparing raw materials, and applications are anticipated in a wide range of fields. For example, in the development of new drugs, if a newly synthesized substance is low in solubility in water or other solvent, it may not be possible to perform physicochemical research, screening, and other examinations of the substance or to perform ADME (absorption, distribution, metabolism, and excretion) tests and other general toxicity, general pharmacology, efficacy, and biochemistry research in preclinical tests using animals. In contrast, microparticulation of organic compounds provides the possibility of enabling research of various new drug candidate substances.

With a medicament or other organic compound to be microparticulated, a structure of a relatively high degree of freedom of molecular motion is formed by the bonding of molecules with each other based on comparatively weak intermolecular forces. Thus, with the above-mentioned microparticulation method, photo-pulverization actions applied by laser light illumination onto an organic compound are relaxed by the high degree of freedom of motion, and microparticulation of the organic compound cannot be performed at high efficiency. Also, even during the microparticulation process, due to progress of aggregation of microparticles with each other or elution or precipitation at microparticle surfaces, the dispersion properties and particle diameter characteristics of the microparticles degrade with time. Such issues also arise when a substance besides an organic compound is subjected to microparticulation.

The present invention has been made to resolve the above issues and an object thereof is to provide a microparticle production method and apparatus that enable organic compounds and other substances to be microparticulated efficiently, and to provide microparticles.

Means for Solving the Problems

In order to achieve the above object, the present invention provides a microparticle production method of photo-pulverizing a substance in a solvent of a to-be-treated liquid to produce microparticles of the substance, the microparticle production method including a microparticulating step of using a to-be-treated body, which contains the substance and with which the solvent of the to-be-treated liquid is made solid, and illuminating a laser light of a predetermined wavelength onto the to-be-treated body to microparticulate the substance in the solvent.

With the above-described microparticle production method, microparticulation by laser light illumination is performed on the to-be-treated body, which contains the substance to be microparticulated and is obtained by performing a predetermined process, etc., on the to-be-treated liquid, as the object of treatment. By using such a to-be-treated body of solid form, microparticulation is performed in a state in which the degree of freedom of molecular motion of the substance is lowered adequately and the dispersion properties and particle diameter characteristics of the microparticles are maintained. Relaxation of the photo-pulverization energy by molecular motion is thus restrained, the quality of the microparticles is maintained, and microparticulation can be performed efficiently. The substance that is microparticulated is preferably an organic compound. A substance besides an organic compound may also be subjected to microparticulation.

Here, a solidified body can be used as the to-be-treated body of solid form. Preferably in the microparticle production method according to the present invention in this case, in the microparticulating step, a solidified body, which is the to-be-treated body that contains the substance and with which the solvent is solidified by cooling the to-be-treated liquid, is used and the substance in the solvent is microparticulated by illuminating the laser light onto the solidified body.

In a case where a solidified body is the to-be-treated body, a microparticle production apparatus according to the present invention is a production apparatus that photo-pulverizes a substance in a solvent of a to-be-treated liquid to produce microparticles of the substance and includes: a treatment chamber, containing the to-be-treated liquid; a cooling means, cooling the to-be-treated liquid and solidifying the solvent to form a solidified body that is a to-be-treated body containing the substance; a solidified state maintaining means, maintaining the solvent in the solidified state in the solidified body; and a laser light source, illuminating a laser light of a predetermined wavelength for microparticulation of the substance in the solvent onto the solidified body contained in the treatment chamber.

With the above-described microparticle production method and apparatus, microparticulation by laser light illumination is performed on the solidified body, which contains the substance to be microparticulated and is obtained by cooling the to-be-treated liquid to a predetermined temperature, as the to-be-treated body. By using such a cooled solidified body, microparticulation is performed in a state in which the degree of freedom of molecular motion of the substance is lowered adequately and the dispersion properties and particle diameter characteristics of the microparticles are maintained. Thus, microparticulation of the substance can be performed efficiently with the relaxation of photo-pulverization energy by molecular motion being restrained and the quality of the microparticles being maintained.

In this case, the production method preferably furthermore includes a gas eliminating step of eliminating a dissolved gas in the solvent before solidifying the solvent. Likewise, the production apparatus preferably has a gas eliminating means for eliminating a dissolved gas in the solvent before solidifying the solvent. Bubbles of the dissolved gases, which become bodies that scatter the laser light, can thereby be prevented from forming in the solidified body in the process of solidifying the solvent.

Furthermore, the production method preferably has a particle dispersing step of dispersing the raw material particles of the substance in the solvent before solidifying the solvent. Likewise, the production apparatus preferably has a particle dispersing means for dispersing the raw material particles of the substance in the solvent before solidifying the solvent. The efficiency of microparticulation of the substance by laser light illumination of the solidified body is thereby improved.

Alternatively, a gel body may be used as the to-be-treated body of solid form. Preferably in the microparticle production method according to the present invention in this case, in the microparticulating step, a gel raw material is dispersed in the solvent of the to-be-treated liquid, a gel body, which is the to-be-treated body containing the substance and with which the solvent, containing the gel raw material, is gelled, is used, and the laser light is illuminated onto the gel body to microparticulate the substance in the solvent.

In a case where a gel body is the to-be-treated body, a microparticle production apparatus according to the present invention is a production apparatus that photo-pulverizes a substance in a solvent of a to-be-treated liquid to produce microparticles of the substance and includes: a treatment chamber, containing a gel body that is a to-be-treated body, which contains the substance and with which the solvent, containing a gel raw material of the to-be-treated liquid is gelled; and a laser light source, illuminating a laser light of a predetermined wavelength for microparticulation of the substance in the solvent onto the gel body contained in the treatment chamber.

With the above-described microparticle production method and apparatus, microparticulation by laser light illumination is performed on the gel body, which is obtained by gelling the to-be-treated liquid and contains the substance to be microparticulated, as the to-be-treated body. By using a gel body gelled in such a manner, microparticulation is performed in a state where the dispersion properties and particle diameter characteristics of the microparticles are maintained. Thus, microparticulation of the substance can be performed efficiently with the quality of the microparticles being maintained.

Although in this case, the gel raw material is not limited in particular, in a case where the microparticles in the gel are to be released under specific conditions, an environment-responsive gel raw material is preferably used. Examples of such gels include gels that respond to pH, light, temperature, electric field, etc.

Preferably in the production method, at least one of separation, classification, and enrichment of the microparticles is performed by application of an electric field inside the gel body in the microparticulating step. Likewise, the production apparatus preferably has an electric field applying means for performing at least one of separation, classification, and enrichment of the microparticles by application of an electric field inside the gel body.

With the production method, the gel body may be connected to a second gel body that does not contain the substance to be microparticulated and the microparticles formed in the gel body may be moved and stored into the second gel body by electrophoresis in the microparticulating step.

Also, with the production method, preferably the temperature of the gel body is cooled in the microparticulating step. Likewise, the production apparatus preferably has a cooling means that cools the temperature of the gel body and a cooled state maintaining means that maintains the gel body in the cooled state. The temperature of the gel body is preferably cooled to no more than 0° C. In this case, in addition to microparticulation being performed in a state in which the dispersion properties and particle diameter characteristics of the microparticles are maintained, microparticulation is performed in a state in which the degree of freedom of molecular motion of the substance is lowered adequately. Microparticulation of the substance can thus be performed efficiently with the relaxation of photo-pulverization energy by molecular motion being restrained and the quality of the microparticles being maintained.

With the above-described production method and apparatus, in cases including those in which the solidified body or the gel body is used as the to-be-treated body, the wavelength of laser light that is illuminated from the laser light source and used in the microparticulating step is preferably not less than 900 nm. Microparticulation of the substance by laser light illumination can thereby be realized favorably.

Also, with the production method and apparatus, in the microparticulating step, the laser light illumination is preferably performed while moving an illumination position of the laser light onto the to-be-treated body. The laser light can thereby be illuminated onto various positions of the solidified body, gel body, or other to-be-treated body, and microparticulation by laser light illumination can be performed efficiently on the substance contained in the respective positions in the to-be-treated body.

In this case, in the production method, the illumination position may be moved by changing an optical path of the laser light in the microparticulating step. Likewise, the production apparatus may have an optical path changing means that moves the illumination position by changing an optical path of the laser light from the laser light source to the treatment chamber.

Also, preferably in the production method, in the microparticulating step, a result of monitoring a shock wave resulting from the microparticulation of the substance is referenced to determine an illumination condition of the laser light onto the to-be-treated body. Likewise, the production apparatus preferably has a shock wave monitoring means that monitors a shock wave due to microparticulation of the substance.

The substance to be microparticulated may be a medicament. In this case, photochemical reaction, etc., of the medicament due to laser light illumination can be prevented adequately to produce microparticles of the medicament without loss of efficacy. Also, by microparticulation of the medicament, the surface area of the medicament is increased and medicament microparticles that are improved in absorption into living tissue can be provided.

Microparticles according to the present invention are microparticles produced by the above-mentioned microparticle production method. With such microparticles, microparticles of an organic compound or other substance that are produced efficiently and are in a satisfactory state can be obtained.

Effects of the Invention

With the present invention, by performing microparticulation by laser light illumination using the to-be-treated body, which contains the substance and with which the solvent of the to-be-treated liquid is made into a solid, the substance can be microparticulated efficiently.

BRIEF DESCRIPTION OF THE DRAWINGS

FIG. 1 is a schematic arrangement diagram of an embodiment of a microparticle production apparatus.

FIG. 2 is a diagram of an arrangement example of an optical path changing device used in the production apparatus shown in FIG. 1.

FIG. 3 is a diagram of an arrangement example of an optical path changing device used in the production apparatus shown in FIG. 1.

FIG. 4 is a diagram of an arrangement example of an optical path changing device used in the production apparatus shown in FIG. 1.

FIG. 5 is a graph of a particle diameter distribution of clobetasone butyrate.

FIG. 6 is a schematic arrangement diagram of another embodiment of a microparticle production apparatus.

FIG. 7 is a perspective view of a treatment chamber used in the production apparatus shown in FIG. 6.

FIG. 8 is a flowchart of an example of a microparticle production method.

FIG. 9 shows diagrams of configurations of electrodes for gel bodies.

FIG. 10 shows diagrams of configurations of gel bodies.

FIG. 11 is a graph of results of monitoring shock waves due to microparticulation of a substance.

FIG. 12 is a graph of a correlation between illumination light intensity and shock wave maximum amplitude for VOPc.

FIG. 13 shows (a) a state before microparticulation and (b) a state after microparticulation, of a gel body.

FIG. 14 shows (a) a state before electrophoresis and (b) a state after electrophoresis, of a gel body.

FIG. 15 is a graph of a correlation between illumination light intensity and shock wave maximum amplitude in clobetasone butyrate.

DESCRIPTION OF THE SYMBOLS

1A—microparticle production apparatus, 2—to-be-treated liquid, 3—treatment chamber, 4—water, ice (solvent), 5—raw material particle (organic compound), 6—solidified body (to-be-treated body), 10—laser light source, 11—optical path changing device, 15—controlling device, 30—thermally insulating layer, 31—opening, 32—dry air insulating layer, 33—light illumination window, 34—dry gas blowing device, 41—magnetic stick, 42—magnetic stirrer, 50—cooling device, 60—depressurizing device,

1B—microparticle production apparatus, 102—to-be-treated liquid, 103—treatment chamber, 104—solvent, 105—raw material particle (substance), 106—gel body (to-be-treated body), 110—laser light source, 115—controlling device, 121—microphone, 122—oscilloscope, 131—light illumination window, 134—dry gas blowing device, 136—spacer, 137—dry air insulating layer, 141—cooling medium, 142—cooling device, 146—XZ motorized stage, 147—stage controller.

BEST MODES FOR CARRYING OUT INVENTION

Preferred embodiments of a microparticle production method and a production apparatus and microparticles according to the present invention shall now be described in detail along with the drawings. In the description of the drawings, elements that are the same shall be provided with the same symbol and overlapping description shall be omitted. The dimensional proportions in the drawings do not necessarily match those of the description.

FIG. 1 is a schematic arrangement diagram of an embodiment of a microparticle production apparatus according to the present invention. This microparticle production apparatus 1A photo-pulverizes an organic compound in a solvent of a to-be-treated liquid to produce microparticles of the organic compound. The to-be-treated liquid 2 is made up of liquid-phase water 4, which is the solvent, and raw material particles 5 of the organic compound to be microparticulated, which are contained in water 4. In particular, with the present embodiment, the to-be-treated liquid 2 is cooled to solidify water 4 to form a solidified body 6, in which raw material particles 5 of the organic compound are contained in the solid-phase ice, and this solidified body 6 is used as a to-be-treated body. In regard to the substance to be microparticulated, in general, a substance besides an organic compound may be microparticulated as well.

As shown in FIG. 1, the microparticle production apparatus 1A has a treatment chamber 3 for containing the to-be-treated liquid 2. The treatment chamber 3 is made, for example, of quartz. A cooling device 50 is installed on an external portion of the treatment chamber 3. The cooling device 50 is a cooling means that cools the to-be-treated liquid 2 inside the treatment chamber 3 to solidify water 4 of the solvent and form the solidified body 6 containing raw material particles 5. In FIG. 1, the cooling device 50 is illustrated schematically.

Along with the above-described cooling device 5, a thermally insulating layer 30 is provided on a periphery of the treatment chamber 3. The thermally insulating layer 30 is a solidified state maintaining means that maintains the solidified body 6, which has been cooled by the cooling device 50, in a cooled state to maintain water (ice) 4 in the solidified body 6 in the solidified state. A material suited for thermal insulation may be used as the thermally insulating layer 30, and styrene foam is preferable as the material of the thermally insulating layer 30 in terms of shape processing and thermal insulation properties.

The production apparatus 1A also has a high-output laser light source 10 that illuminates a laser light of a predetermined wavelength onto the solidified body 6, contained inside the treatment chamber 3 and maintained in the state in which water 4 is solidified. This laser light source 10 supplies a laser light having a favorable wavelength for microparticulating raw material particles 5 of the organic compound in solidified water 4.

As the laser light source 10, if the wavelength to which the laser light is to be set is known in advance, a fixed-wavelength laser light source may be used. Or, a variable-wavelength laser light source may be used as the laser light source 10. In this case, laser light of an appropriate wavelength can be set and illuminated as suited according to the light absorption characteristics, etc., of the organic compound. Also, if necessary, an attenuation filter, light attenuator, or other light intensity adjusting means may be provided for the laser light source 10.

For this laser light source 10, an opening 31 is provided in a front face portion, opposing the laser light source 10, of the thermally insulating layer 30 that surrounds the treatment chamber 3. A region between the thermally insulating layer 30 and a front face of the treatment chamber 3 that includes the interior of the opening 31 is arranged as a dry air insulating layer 32 that exhibits the same thermal insulation action as the thermally insulating layer 30, and a thermally insulated state is thereby maintained for the to-be-treated liquid 2 or the solidified body 6 in the treatment chamber 3.

A light illumination window 33, formed of a glass plate, etc., that covers the opening 31, is installed on an outer face of the thermally insulating layer 30. Also, to prevent the laser light from not being illuminated under good conditions due to condensation of dew on an outer face of the light illumination window 33 over a long term, a dry gas blowing device 34, which blows dry gas (for example, nitrogen gas) onto the outer face of the light illumination window 33 to prevent dew condensation, is installed.

A magnetic stick 41 is contained along with the to-be-treated liquid 2 inside the treatment chamber 3. By this magnetic stick 41 and the magnetic stirrer 42, a particle dispersing means is arranged for dispersing raw material particles 5 in water 4 by stirring water 4 and raw material particles 5 in the to-be-treated liquid 2 inside the treatment chamber 3 before solidifying water 4 of the to-be-treated liquid 2.

Also, a depressurizing device 60 is connected to the treatment chamber 3 in which the to-be-treated liquid 2 is contained. This depressurizing device 60 functions as a gas eliminating means that depressurizes the interior of the treatment chamber 3 to eliminate dissolved gases in water 4 before solidifying water 4 of the to-be-treated liquid 2.

An optical path changing device 11 is installed between the laser light source 10 and the light illumination window 33, disposed at the front face side of the treatment chamber 3. By this optical path changing device 11, the optical path of the laser light from the laser light source 10 to the treatment chamber 3 is changed during laser light illumination as shown schematically in FIG. 1.

The laser light source 10 and the optical path changing device 11 are connected to a controlling device 15 arranged from a computer, etc. In the present embodiment, this controlling device 15 is also connected to the dry gas blowing device 34, the magnetic stirrer 42, and the depressurizing device 60. This controlling device 15 controls operations of respective portions of the above-described production apparatus 1A to control the production of microparticles.

A microparticle production method according to the present invention that makes use of the microparticle production apparatus 1A, shown in FIG. 1, shall now be described.

First, water 4, which is in the liquid phase, and raw material particles 5 of the organic compound to be microparticulated are mixed to prepare the to-be-treated liquid 2. Raw material particles 5 are put in a state of being contained in water 4 as a dissolved substance or a non-dissolved substance. The to-be-treated liquid 2 is then introduced into the treatment chamber 3 and the to-be-treated liquid 2 inside the treatment chamber 3 is cooled by means of the cooling device 50. When the temperature of the to-be-treated liquid 2 becomes close to the freezing point of water 4, the to-be-treated liquid 2 is stirred by the magnetic stick 41 and the magnetic stirrer 42 to disperse raw material particles 5 in water 4 (particle dispersing step). Also, before cooling or during cooling of the to-be-treated liquid 2, the interior of the treatment chamber 3 is depressurized by the depressurizing device 60 to eliminate dissolved gases in water 4 (gas eliminating step).

Thereafter, the to-be-treated liquid 2 is cooled quickly to a temperature slightly above the freezing point by the cooling device 50, and then water 4, which is the solvent, is solidified at a slow cooling rate to form the solidified body 6 of high transparency that contains raw material particles 5 of the organic compound. Because cracks may form in the solidified body 6 if cooling is performed rapidly at this point, the temperature is preferably lowered gradually to a predetermined cooling temperature that is targeted. The laser light source 10 is then controlled by controlling device 15, and the laser light, with the wavelength set according to the light absorption characteristics of the organic compound making up raw material particles 5, etc., is supplied from the laser light source 10 to the solidified body 6.

The laser light supplied from the laser light source 10 is illuminated onto the solidified body 6 via the optical path changing device 11, the light illumination window 33, the dry air insulating layer 32, and the front face of the treatment chamber 3. By this laser light illumination, raw material particles 5 in solidified water 4 in the solidified body 6 inside the treatment chamber 3 are microparticulated and microparticles of the organic compound are produced (microparticulating step).

Also, with this embodiment, the laser light illumination is performed while the optical path of the laser light from the laser light source 10 to the treatment chamber 3 is changed successively and continuously by the optical path changing device 11. The illumination position of the laser light onto the solidified body 6 is thereby moved and microparticulation of raw material particles 5 in the solidified body 6 is performed at the respective illumination positions.

Effects of the microparticle production method and production apparatus according to the present embodiment shall now be described.

With the above-mentioned microparticle production method and apparatus, the solidified body 6, which contains the organic compound to be microparticulated and is obtained by cooling the to-be-treated liquid 2, made up of water 4 and raw material particles 5, to a predetermined temperature by the cooling device 50, is subject, as the to-be-treated body, to microparticulation by laser light illumination. By using the solidified body 6 that is thus cooled to an adequately low temperature, microparticulation is performed in a state in which the degree of freedom of molecular motion of the organic compound is lowered adequately. Microparticulation of the organic compound by illumination of the laser light from the laser light source 10 onto the solidified body 6 can thus be realized efficiently with the relaxation of the photopulverization energy by molecular motion being restrained. Thus, by using the above-described production method, organic compound microparticles that are produced efficiently and are in a good state can be obtained.

The method of illuminating the laser light onto the solidified body 6 also provides the merit that the organic compound microparticles formed by performing the photo-pulverization process on raw material particles 5 do not aggregate with each other and dissolution and precipitation at the microparticle surfaces do not occur in the solidified body 6. Also, by maintaining the low temperature so that the solidified state of the solidified body 6 is maintained after the process of photo-pulverization by laser light illumination, the microparticles can be preserved in a state in which aggregation of the microparticles with each other and dissolution and precipitation at the microparticle surfaces are prevented. As the cooling device 50 for cooling and making to-be-treated liquid become the solidified body 6, for example, a normal refrigerator or a Peltier element, etc., may be used. Or, liquid nitrogen, dry ice, or other cooling medium may be used.

Also, with the above-described embodiment, before solidifying water 4, which is the solvent, the interior of the treatment chamber 3, in which the to-be-treated liquid 2 is contained, is depressurized by the depressurizing device 60 to eliminate the dissolved gases in water 4. Bubbles of the dissolved gases are thereby prevented from forming inside the solidified body 6 and becoming scatterers of the laser light when water 4 is solidified. The forming of byproducts due to oxidation reactions during photo-pulverization can also be restrained by the removal of dissolved oxygen. Besides the method of depressurizing the interior of the treatment chamber 3 by the depressurizing device 60, a method of eliminating dissolved gases by repeatedly freezing and melting water 4 of the to-be-treated liquid 2 can be cited as a specific example of a gas eliminating method used to eliminate the dissolved gases. When such a method is used, the depressurizing device 60 is unnecessary. Other examples include a method of using ultrasonic waves, a method of bubbling hydrogen or other gas that is low in solubility in water, etc.

Furthermore in the above-described embodiment, before solidifying water 4, which is the solvent, the to-be-treated liquid 2 is stirred by means of the magnetic stick 41 and the magnetic stirrer 42 to disperse raw material particles 5 in water 4. The solidified body 6, which is obtained by solidifying water 4, can thereby be made a solidified body of uniform and high transparency, and the efficiency of microparticulation of the organic compound by laser light illumination can be improved.

Also, with the above-described microparticle production method and apparatus, microparticulation by laser light illumination is performed while moving the illumination position of the laser light with respect to the solidified body 6. The laser light can thereby be illuminated on various positions of the solidified body 6 to execute microparticulation by laser light illumination uniformly and efficiently on the organic compound at the respective positions in the solidified body 6. Also, when laser light illumination is performed continuously on the same raw material particles 5 in the solidified body 6, modification of raw material particles 5 by heat or fusion of the microparticles with each other, etc., may occur due to heating. In contrast, by scanning the laser light, the fusion of the microparticles with each other, etc., due to heating are restrained. Besides the method of using the optical path changing device 11 as shown in FIG. 1, a method of moving the solidified body 6 or other method may be used to move the illumination position.

Here, the wavelength of the laser light that is illuminated from the laser light source 10 onto the solidified body 6 is preferably a wavelength in the infrared range and more preferably a wavelength of no less than 900 nm. Microparticulation of the organic compound by laser light illumination can thereby be realized favorably. Also, the use of a pulse laser light source as the laser light source 10 is preferable. In particular, to perform microparticulation at an adequate efficiency while restraining the occurrence of unnecessary photochemical reactions and thermal decomposition in the solidified body 6, a pulse laser light source, which, as long as the threshold of the light intensity that causes photo-pulverization is exceeded, is low in illumination energy per pulse and has a high repetition frequency, is preferably used.

Also, the organic compound of raw material particles 5 that is to be microparticulated by laser light illumination may be a medicament (medical drug related substance). In this case, by performing microparticulation efficiently, photochemical reactions of the medicament due to laser light illumination are adequately prevented. Microparticles of the medicament can thereby be produced without loss of efficacy. Also, in regard to photochemical reactions of the medicament, the occurrence of photochemical reactions can be restrained further by favorable selection of the wavelength of the laser light (for example, selection of the above-described wavelength of no less than 900 nm) illuminated onto the solidified body 6.

More specifically, an organic compound that is used as a medicament contains comparatively weak chemical bonds in the molecular structure in many cases, and when ultraviolet light or other light is illuminated onto such an organic compound, although microparticles can be generated in part, photochemical reactions of the organic compound via electron excitation states may occur in part at the same time and form impurities. In particular, in a case where the organic compound is a medicament (medical product) that is administered into a body, because such impurities may cause side effects and have ill effects on a living body, such circumstances must be avoided as much as possible. In contrast, by producing microparticles of the organic compound by the above-described production method that enables the occurrence of photochemical reactions to be restrained, the forming of impurities can be restrained adequately. Also, with the above-described production method, by performing the photo-pulverization process with the to-be-treated liquid 2 being placed in the state of the solidified body 6 at low temperature, the degradation of the medicament or other organic compound by thermal decomposition in the process of laser light illumination is also restrained.

Also, as described above, by realizing microparticulation of medicaments while maintaining the efficacy, physicochemical research, screening, and other processes of examining and determining candidate compounds, ADME tests and other general toxicity, general pharmacology, efficacy, and biochemistry research in preclinical tests using animals, and clinical tests, which could not be conducted with the medicament being in a form prior to microparticulation, are made possible. Also, because by the above-described production method, an extremely wide variety of medicaments that can be administered to living bodies can be obtained, the width of selection of medicaments can be broadened significantly. Also, since by microparticulation of a medicament, the medicament is increased in surface area and improved in absorption into living tissue, medicament microparticles that are effective in small amounts can be obtained. Such a microparticulation process is also effective for organic compounds besides medicaments.

Specific examples of organic compounds to be microparticulated include clobetasone butyrate, carbamazepine, and other poorly soluble medicaments. Besides the above-described medical drug substances, the above-described microparticle production method and apparatus can also be applied to medical drug candidate substances (natural substances, compound libraries, etc.), quasi-drugs, cosmetics, etc. In regard to the substances to be microparticulated, substances besides organic compounds may generally be subjected to microparticulation.

As the solvent of the medicament or other organic compound, water is preferably used as described above, and small amounts of ethanol, sugar, or salt may be contained. Or, a solvent besides water may be used. Examples of such a solvent include ethyl alcohol, which is a monohydric alcohol, glycols (propylene glycol, polyethylene glycol, etc.), which are dihydric alcohols, glycerol, which is a trihydric alcohol, etc. Soybean oil, corn oil, sesame oil, peanut oil, etc., which are vegetable oils, may also be used as the solvent. In a case of use as an injectable solution, such a solvent can be used favorably as an organic solvent of a non-aqueous injectable solution.

In regard to the stoppage of illumination of the laser light onto the solidified body 6 in the production of microparticles by the microparticle production apparatus 1A shown in FIG. 1, the intensity and duration of the laser light necessary for microparticulation can be determined in advance and the laser light illumination can be controlled based on the treatment time. Or, a monitoring means that monitors the microparticulation state of raw material particles 5 in the solidified body 6 may be installed and the laser light illumination may be controlled according to the monitoring results.

Figure 2:
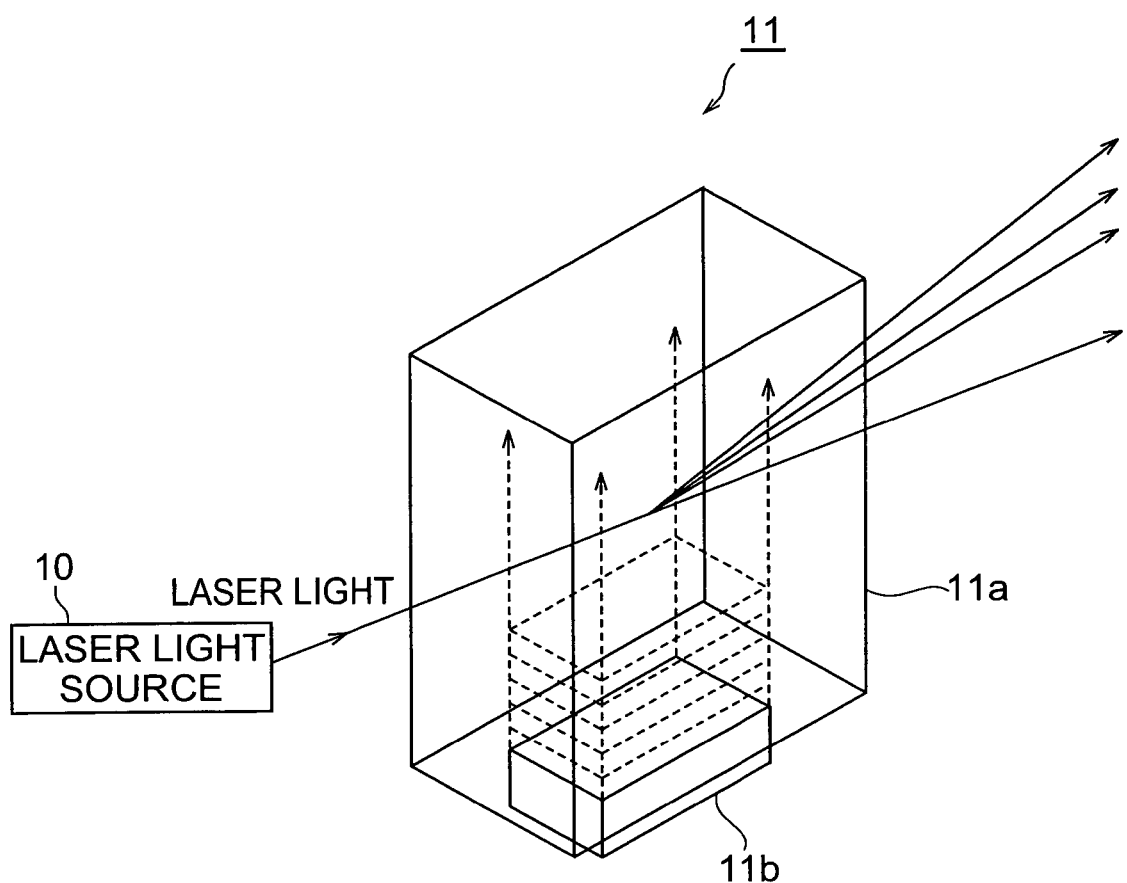
Figure 3:
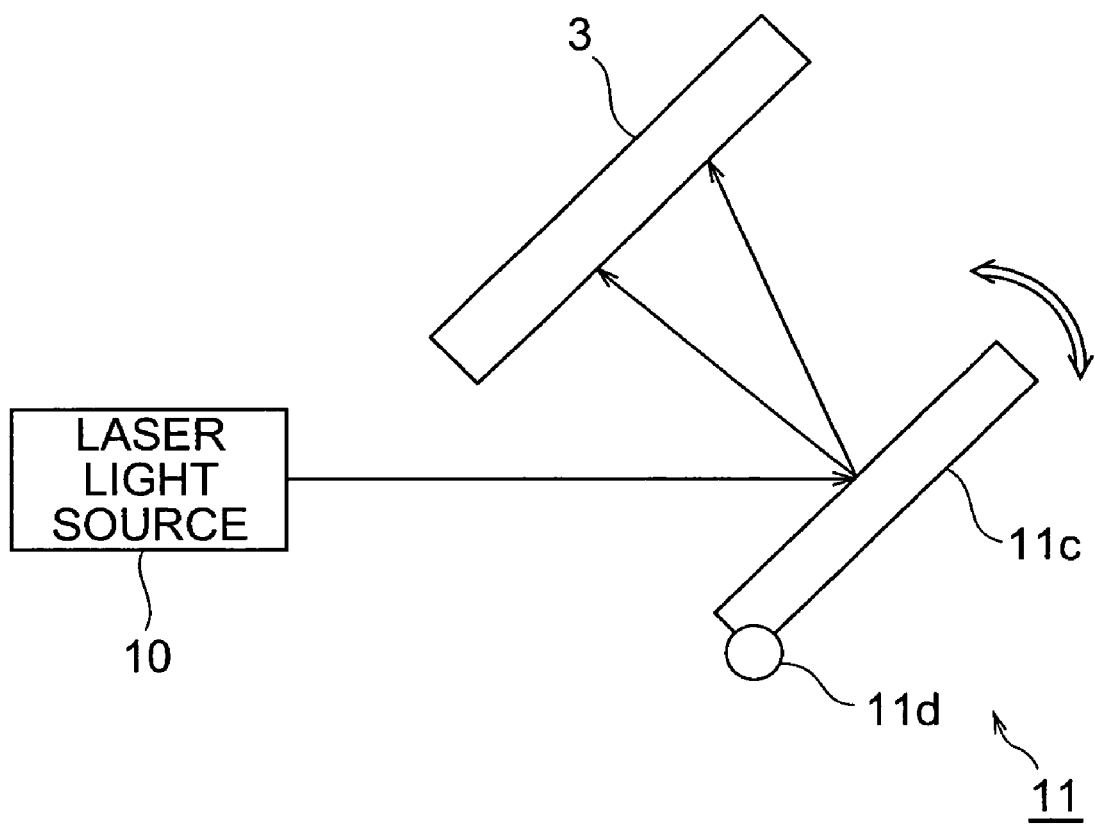
Figure 4:
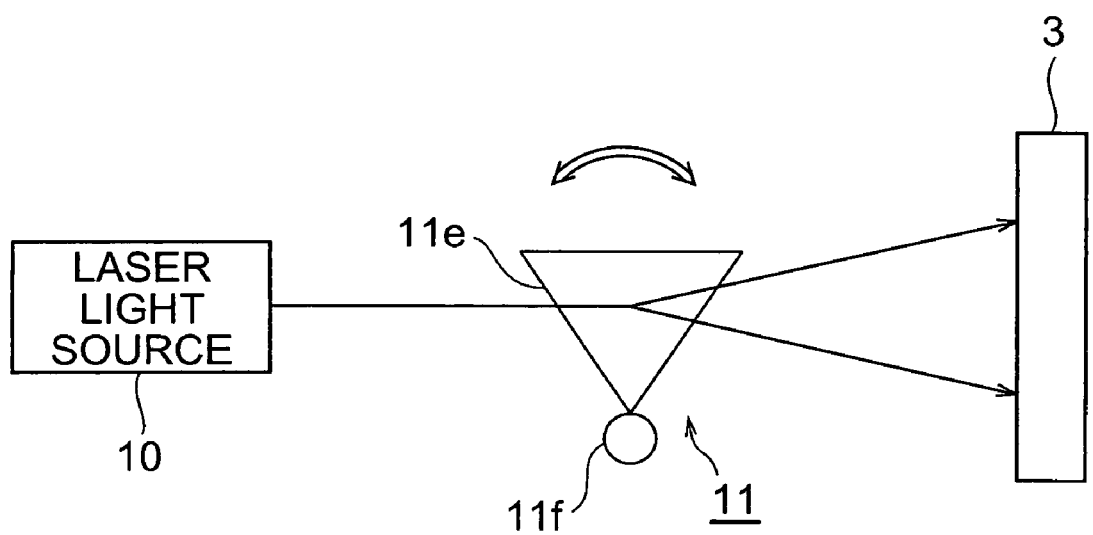

As specific examples of the optical path changing device 11 for moving the illumination position of the laser light onto the solidified body 6, various devices may be used as shown in FIG. 2 to FIG. 4.

The optical path changing device 11 shown in FIG. 2 uses an acoustooptic element, and here, ultrasonic waves are generated in tellurium dioxide or other optical medium 11a by means of a transducer 11b and the laser light from the laser light source 10 is deflected by being diffracted by the wave fronts of the propagating ultrasonic waves (indicated by the dashed line arrows in FIG. 2). High-speed scanning of the laser light can be realized with such an optical path changing device 11 because it has no mechanically moving parts.

The optical path changing device 11 shown in FIG. 3 uses a reflecting mirror, and here, by fixing one end of a reflecting mirror 11c on a rotating shaft 11d and making the other end undergo circular motion mechanically, the direction of reflection of the laser light from the laser light source 10 is changed to scan laser light toward the treatment chamber 3. As a specific method of driving the reflecting mirror 11c in this case, for example, a surface of a speaker is adhered to the movable end of the reflecting mirror 11c and the reflecting mirror 11c is driven by vibration of the speaker.

The optical path changing device 11 shown in FIG. 4 uses a prism, and here, by fixing one end of a prism 11e on a rotating shaft 11f and making the other end undergo circular motion mechanically in the same manner as in FIG. 3, the direction of transmission of the laser light from the laser light source 10 is changed to scan laser light toward the treatment chamber 3. Such an arrangement is also applicable to an optical component, besides a prism, that allows transmission of the laser light.

Although details of the present invention shall now be described more specifically by way of an example, the present invention is not limited to the following example.

In this example, microparticulation was attempted with the poorly soluble medicament, clobetasone butyrate (a synthetic topical corticosteroid), as the organic compound of raw material particles 5 to be microparticulated. A solution, having clobetasone butyrate powder, which corresponds to being raw material particles 5, suspended in water 4 at a concentration of 3 mg/ml, was used as the to-be-treated liquid 2. In order to simplify the treatment step, the particle dispersion and gas elimination processes were performed in advance and the magnetic stick 41, the magnetic stirrer 42, and the depressurizing device 60, shown in FIG. 1, were not used.

Polysolvate 80 (molecular weight: 1310), which is a surfactant, was added to a concentration of $2.52 \times 10^{-5}$ mol/l (2.1 times the critical micelle concentration) to the above-described to-be-treated liquid 2, and stirring was performed using a vortex to prepare the to-be-treated liquid 2 prior to photo-pulverization. After then performing the process of eliminating a dissolved gas by depressurization, the to-be-treated liquid 2 was immediately loaded into the treatment chamber 3 of 2 mm thickness, and the treatment chamber 3 was cooled by liquid nitrogen from the side opposite the laser light illumination face to solidify water 4 to the ice state and make it become the solidified body 6 of high transparency.

Then, while blowing on dry nitrogen by means of the dry gas blowing device 34, the light illumination window 33, which enables the illumination of laser light from the exterior, was installed, and illumination of laser light of high output from the laser light source 10 was performed. In the present example, the optical path changing device 11, shown in FIG. 1, was not used, and uniform laser light illumination was performed by varying the position of the treatment chamber 3 by an XY stage. As conditions of laser light illumination onto the solidified body 6, the wavelength was 1064 nm, the light intensity per pulse of pulse laser light was 1732 mJ/cm$^2$, the laser light spot diameter was φ5 mm, the repetition frequency was 10 Hz, and the illumination duration was 10 minutes. The solidified body 6, which had been subjected to photo-pulverization, was then returned to a state in which microparticles of the organic compound are suspended in liquid-phase water 4, and the results of the photo-pulverization process were examined using a particle size distribution measuring device (SALD7000, made by Shimadzu Corp.).

Figure 5:
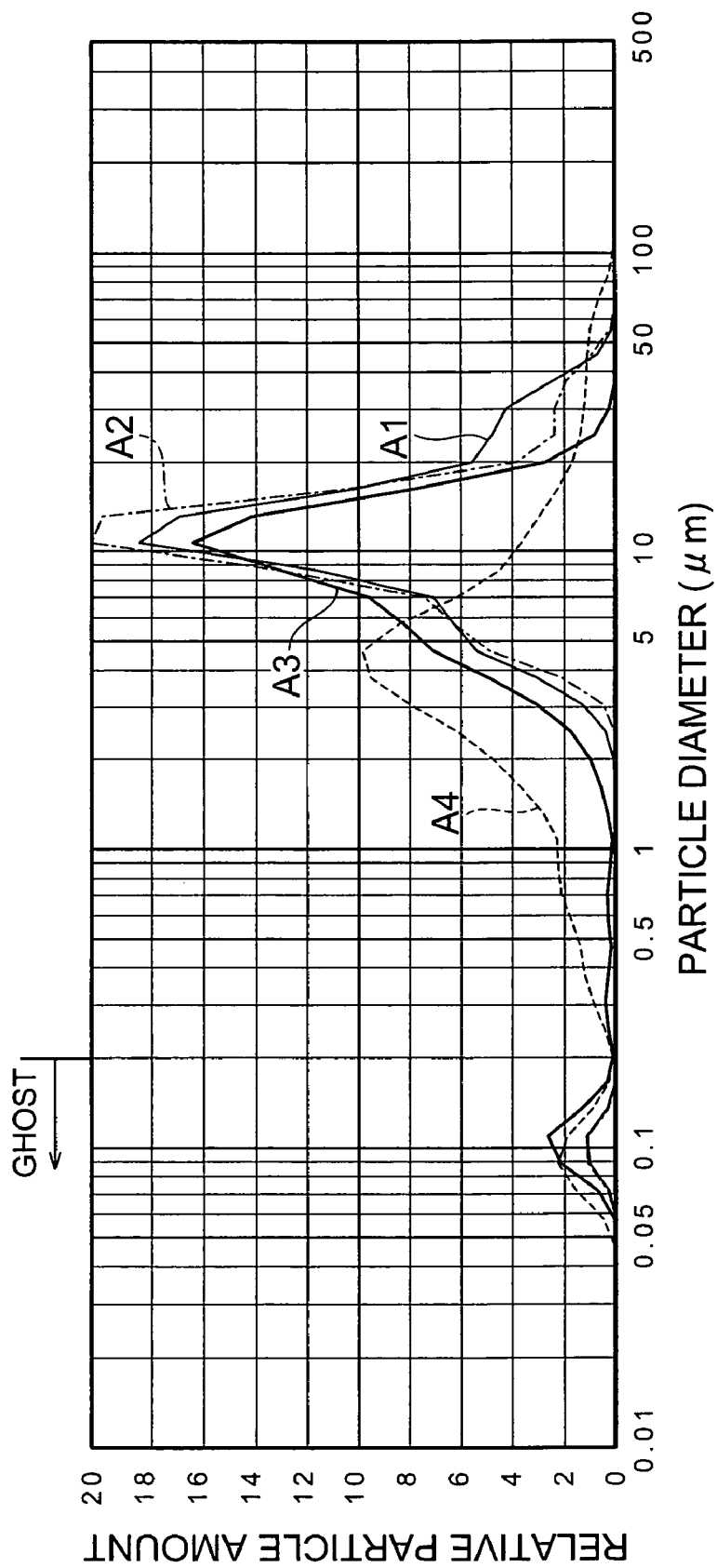

FIG. 5 is a graph of the particle diameter distribution of clobetasone butyrate. In this graph, the abscissa indicates the particle diameter (μm) of clobetasone butyrate and the ordinate indicates the relative particle amount in terms of volume. When the particle diameter is measured over an extremely broad range with the above-mentioned measuring device, a ghost appears near a particle diameter of 0.1 μm as shown in FIG. 5. The microparticulation was thus evaluated using distributions of particle diameters of 0.2 μm or more.

In the graph of FIG. 5, graph A1 indicates the particle diameter distribution in the state in which the raw material particles of clobetasone butyrate are suspended in water and simply dispersed by the vortex. This graph shows that the raw material particles have a particle diameter of approximately 2 to 50 μm. Graph A2 shows the particle diameter distribution in the case where just the cooling/solidification process at a temperature of −195.8° C. is performed by liquid nitrogen. Although a comparison of graphs A1 and A2 shows that the particle diameter distribution at several dozen μm is slightly decreased in graph A2, a large change is not seen.

Graph A3 indicates the particle diameter distribution for the case where the photo-pulverization process by laser light illumination is carried out under the above-described illumination condition with the raw material particles being suspended in water that is not solidified. A comparison with graph A1 shows that with graph A3, the particle diameter distribution is shifted, although slightly, to the smaller particle diameter side. This indicates that the laser light illumination causes photo-pulverization of the raw material particles of the organic compound under the above-described illumination conditions.

Meanwhile, graph A4 indicates the particle diameter distribution for the case where the photo-pulverization process by laser light illumination is carried out under the above-described illumination condition with the raw material particles being contained in solidified ice according to the method of the present invention. A comparison with graph A3, for the case of using the to-be-treated liquid, shows that graph A4, for the case of using the solidified body, indicates that, as in water in the liquid phase, photo-pulverization by laser light illumination is possible in ice in the solidified body state and that the efficiency of the photo-pulverization process is higher in ice (solidified body) than in water (to-be-treated liquid). It was thus confirmed that by performing laser light illumination on the solidified body, with which the water that is the solvent is solidified, raw material particles 5 of the organic compound can be photo-pulverized at a high efficiency.

The microparticle production method and production apparatus and the microparticles according to the present invention shall now be described further. With the above-described embodiment and example, a solidified body, which is the to-be-treated body that contains the substance and with which the solvent is solidified by cooling of the to-be-treated liquid, is used and microparticulation is performed by illuminating laser light onto this solidified body. Generally, with this method, microparticulation can be performed by using a to-be-treated body, which contains the substance and with which the solvent of a to-be-treated liquid is made into a solid, and illuminating a laser light of a predetermined wavelength onto this to-be-treated body.

By using such a to-be-treated body, microparticulation is performed in a state in which the degree of freedom of molecular motion of the substance is lowered adequately and the dispersion properties and particle diameter characteristics of the microparticles are maintained. Microparticulation can thus be performed efficiently with the relaxation of the photo-pulverization energy by molecular motion being restrained and the quality of the microparticles being maintained. As such a to-be-treated body of solid form, not only a solidified body, such as that exemplified by the above-described embodiment, but, for example, a gel body, which contains the substance to be microparticulated and with which a gel raw material is dispersed in a solvent of a to-be-treated liquid and the solvent including the gel raw material is gelled, may also be used. A case where a gel body is used as the to-be-treated body shall now be described.

Figure 6:
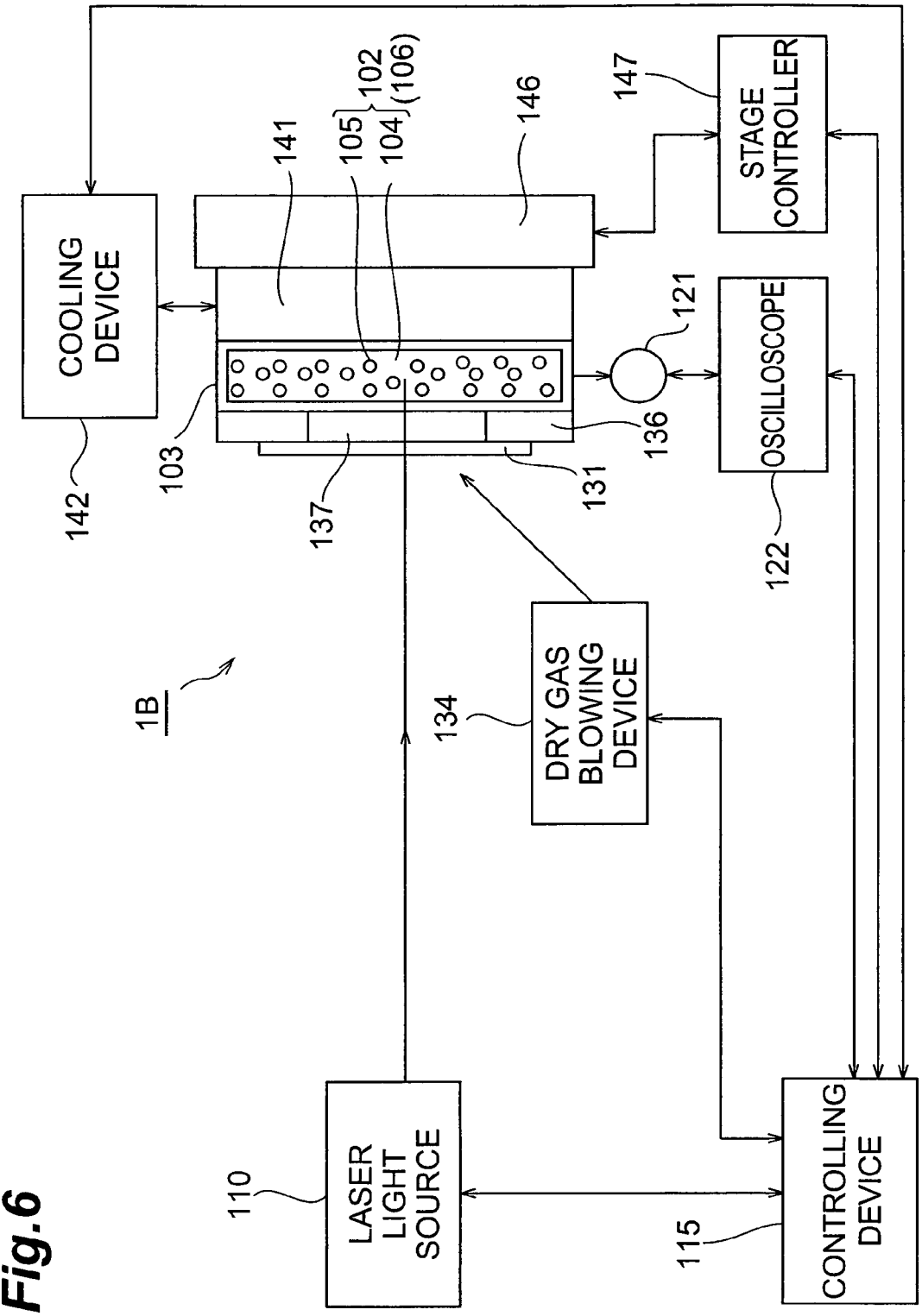
Figure 7:
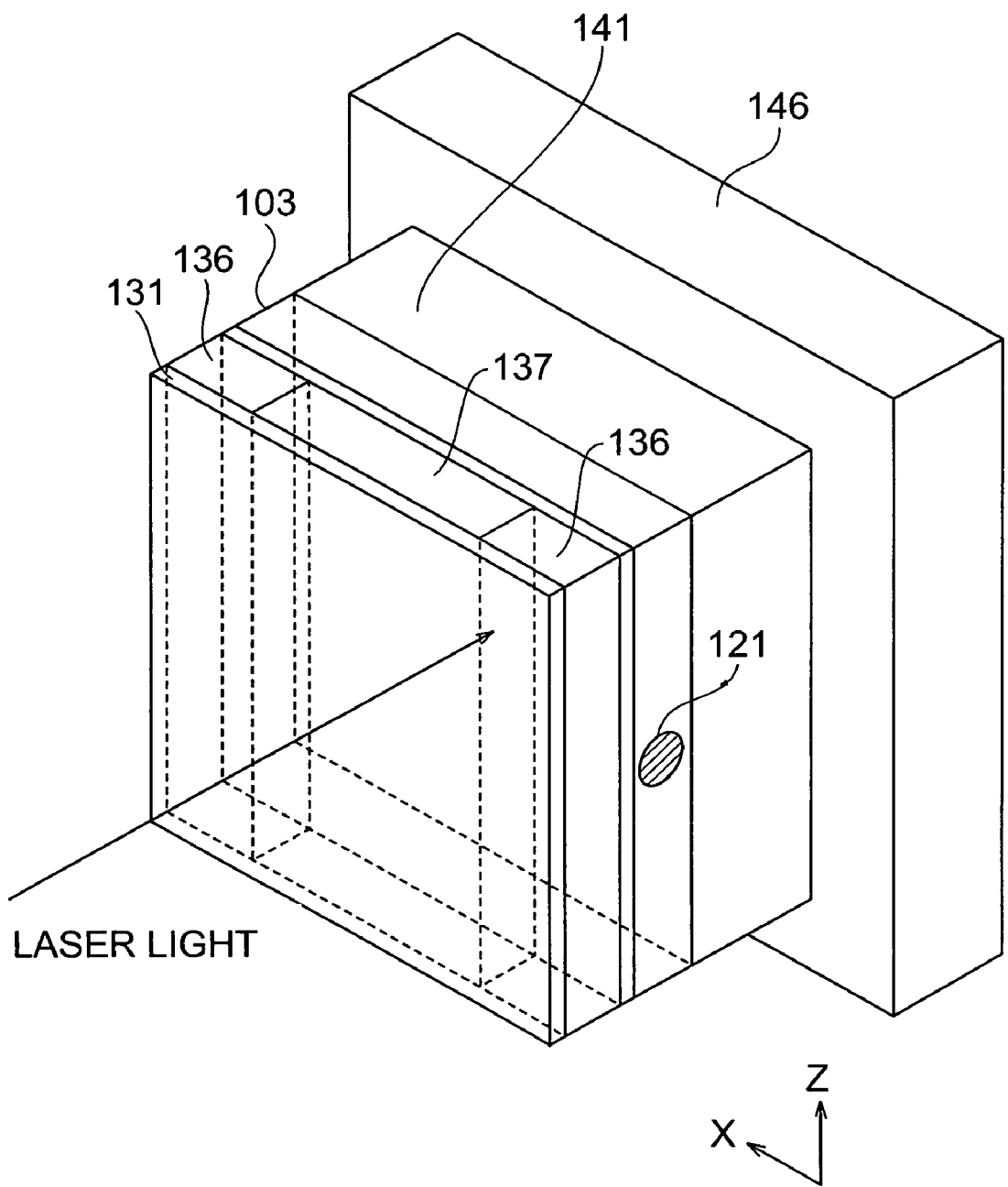

FIG. 6 is a schematic arrangement diagram of another embodiment of a microparticle production apparatus according to the present invention. FIG. 7 is a perspective view of a treatment chamber used in the production apparatus shown in FIG. 6.

This microparticle production apparatus 1B photo-pulverizes an organic compound or other substance in a solvent of a to-be-treated liquid to produce microparticles of the organic compound or other substance. The to-be-treated liquid 102 is made up of a liquid-phase solvent 104 and raw material particles 105 of the substance to be microparticulated, which are contained in the solvent 104. In particular, with the present embodiment, a gel raw material is dispersed in the solvent 104 of the to-be-treated liquid 102, the solvent 104, including the gel raw material, is gelled to form the gel body 106, in which raw material particles 105 of the substance are contained in a dispersed and fixed state, and this gel body 106 is used as the to-be-treated body.

As shown in FIG. 6, the microparticle production apparatus 1B has a treatment chamber 103 for containing the to-be-treated liquid 102 and the gel body 106, with which the to-be-treated liquid 102 is gelled. The treatment chamber 103 is made, for example, of quartz. A cooling medium 141, which is connected to a cooling device 142, is disposed on a rear face of the treatment chamber 103. The cooling medium 141 is a cooling means that cools the gel body 106 to a predetermined temperature (preferably a temperature no more than 0° C.) as necessary. If the gel body 106 is to be cooled, a cooled state maintaining means, such as thermal insulating layer 30 shown in FIG. 1, is preferably provided to maintains the gel body 106 in the cooled state.

This production apparatus 1B also has a high-output laser light source 110 that illuminates a laser light of a predetermined wavelength onto the gel body 106, contained inside the treatment chamber 103. This laser light source 110 supplies the laser light that is favorable in wavelength for microparticulating raw material particles 105 of the substance in the gelled solvent 104.

As the laser light source 110, if the wavelength to which the laser light is to be set is known in advance, a fixed-wavelength laser light source may be used. Or, a variable-wavelength laser light source may be used as the laser light source 110. In this case, laser light of an appropriate wavelength can be set and illuminated as suited according to the light absorption characteristics, etc., of the substance. Also, if necessary, an attenuation filter, light attenuator, or other light intensity adjusting means may be provided for the laser light source 110.

For this laser light source 110, a light illumination window 131 is installed at a front face side, which of the outer faces of the treatment chamber 103, opposes the laser light source 110. To the rear of the light illumination window 131, a dry air insulating layer 137, formed by spacers 136 of a thermally insulating material, is provided to improve the thermal insulation property with respect to the treatment chamber 103. Also, to prevent the laser light from not being illuminated under good conditions due to condensation of dew on an outer face of the light illumination window 131 over a long term, a dry gas blowing device 134, which blows dry gas (for example, nitrogen gas) onto the outer face of the light illumination window 131 to prevent dew condensation, is installed.

At a rear face side of the cooling medium 141 is installed an XZ stage 146, which is a motorized stage for moving the treatment chamber 103, the cooling medium 141, etc., in an X direction and a Z direction (see FIG. 7). This XZ stage 146 is driven and controlled by a stage controller 147.

Also, a microphone 121 is installed at a predetermined position with respect to the treatment chamber 103, containing the gel body 106 to be treated. The microphone 121 is a shock wave monitoring means that monitors shock waves that are generated as a result of microparticulation of raw material particles 105 of the substance. This microphone 121 is connected to an oscilloscope 122, and the shock waves generated in the treatment chamber 103 are monitored by monitoring an output signal from the microphone 121 by means of the oscilloscope 122.

The laser light source 110 is connected to a controlling device 115 arranged from a computer, etc. In the present embodiment, this controlling device 115 is also connected to the oscilloscope 122, the dry gas blowing device 134, the cooling device 142, and the stage controller 147. This controlling device 115 controls operations of respective portions of the above-described production apparatus 1B to control the production of microparticles.

Figure 8:
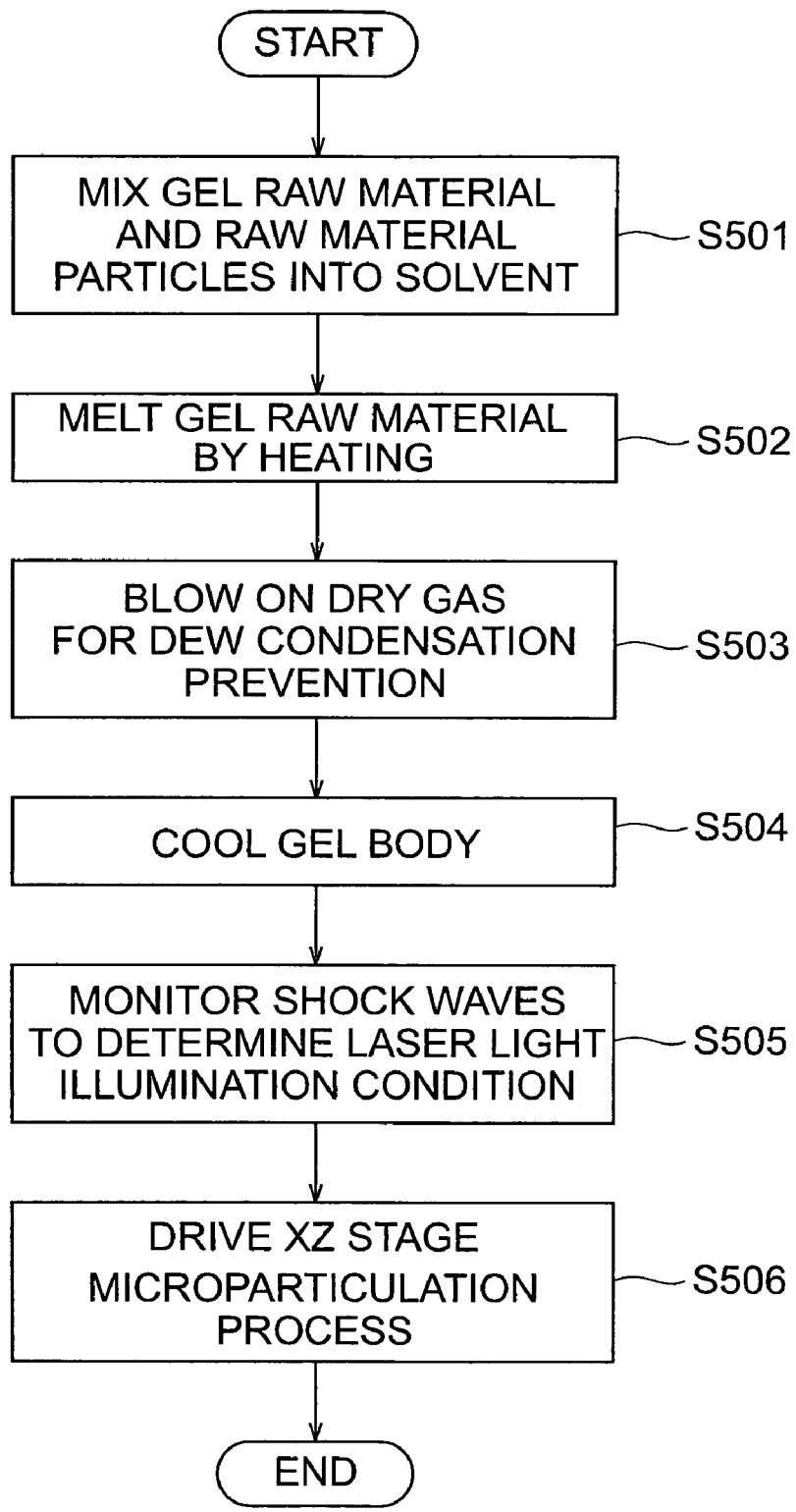

A microparticle production method according to the present invention that makes use of the microparticle production apparatus 1B shown in FIG. 6 shall now be described with reference to FIG. 8. FIG. 8 is a flowchart of an example of a microparticle production method according to the present invention.

First, the gel raw material of powder form and raw material particles 105 of the substance to be microparticulated are mixed into the solvent 104 that is in the liquid phase to prepare the to-be-treated liquid 102 (step S501). Raw material particles 105 are put in a state of being contained in the solvent 104 as a dissolved substance or a non-dissolved substance. The solvent 104 is then heated to a temperature at which the gel raw material melts and is filled into the treatment chamber 103 with raw material particles 105 being dispersed to form the gel body 106, which is the to-be-treated body that contains raw material particles 105 (S502).

Dry gas for dew condensation prevention is then blown from the dry gas blowing device 134 onto the light illumination window 131 to prevent the optical path of the laser light from the laser light source 110, used for microparticulation, from being obstructed by dew condensation during the cooling (S503). The gel body 106, containing raw material particles 105, is then cooled by the cooling device 142 and the cooling medium 141 to an appropriate temperature, preferably a temperature no more than 0° C., at which the gel body 106, containing raw material particles 105, does not freeze (S504). The laser light source 110 is then controlled by the controlling device 115, and the laser light, with the wavelength set according to the light absorption characteristics of the substance making up raw material particles 105, is supplied from the laser light source 110 to the gel body 106.

The laser light supplied from the laser light source 110 is illuminated onto the gel body 106 via the light illumination window 131, the dry air layer 137, and the front face of the treatment chamber 103. In this state, the microphone 121, mounted to the treatment chamber 103, and the oscilloscope 122 are used to monitor the generation of a shock wave that accompany microparticulation, and the illumination condition of the laser light for microparticulating raw material particles 105 of the substance is determined with reference to the monitoring result (S505).

By illuminating the laser light under the illumination condition determined as described above, raw material particles 105 in the gelled solvent 104 are microparticulated in the gel body 106 inside the treatment chamber 103, and microparticles of the organic compound or other substance are thereby produced. Also, by driving the XZ stage 146 and moving the position of the gel body 106, contained in the treatment chamber 103, in the X direction and the Z direction, the laser light is illuminated across a predetermined range of the gel body 106 and the required microparticulation process is completed (S506).

Effects of the microparticle production method and production apparatus according to the present embodiment shall now be described.

With the above described microparticle production method and apparatus, the gel body 106, which contains the substance to be microparticulated and is obtained by gelling the to-be-treated liquid 102, made up of the solvent 104 and raw material particles 105, is subject, as the to-be-treated body, to microparticulation by laser light illumination. By thus using the gel body 106, in which raw material particles 105 are dispersed and fixed, microparticulation is performed in a state in which aggregation of the microparticles and elution and precipitation at the microparticle surfaces are prevented. Also, by cooling the gel body, microparticulation is performed in a state in which the degree of freedom of molecular motion of the substance is lowered. Microparticulation of the substance can thus be realized efficiently by illuminating the laser light from the laser light source 110 onto the gel body 106 with the relaxation of the photo-pulverization energy by molecular motion being restrained and while maintaining the dispersion properties and quality of the microparticles. Thus, by using the above-described production method, microparticles of the substance that are produced efficiently and are in a good state can be obtained.

Also, with the microparticulation in the gel body 106, because the raw material particles and formed microparticles of the substance are confined by the network structure of the gel, the microparticles can be left in the state in which the dispersion state and particle diameters immediately after processing are maintained. Also, since the motion of the liquid phase itself is confined by the network of the gel, aggregation of the microparticles with each other and elution and precipitation at the microparticle surfaces can be restrained. Thus, by using the gel body as the to-be-treated body of microparticulation, stable preservation, with which the dispersion properties and particle diameters of the formed microparticles are maintained over a long period, can be achieved.

Generally, a gel powder raw material melts at a temperature of no less than 90° C. and gels at approximately 37 to 39° C. Thus, when the gel body 106 is to be the to-be-treated body and if high temperatures are to be avoided for raw material particles 105 of the substance to be microparticulated, raw material particles 105 are preferably mixed and dispersed immediately before gelation. Also, a low melting point type gel has a low melting point of approximately 65° C. and the gelation temperature thereof is approximately 30° C. and close to room temperature. The raw material particles can thus be dispersed and mixed in the gel while avoiding thermal degradation.

Also, as the gel raw material, an external-environment-responsive gel raw material is preferably used. Such an environment-responsive gel is effective in a case where the release of the microparticles inside the gel to the exterior is to be controlled, etc. That is, the use of a functional gel enables an operation of releasing the microparticles in the gel to the exterior only under a special environment, etc. For example, by using a pH-environment-responsive gel, a digestive organ at which a medicament is to be absorbed can be limited in oral administration of medicament microparticles.

As such gels, those with which the breakdown of the gel can be carried out by control, for example, of pH, light, temperature, electric field, etc., have been developed. As representative examples, poly-N-isopropylacrylamide (PolyNIPAAm) and dehydroalanine (DHA) are known as gels responsive to pH, light, temperature, and electric field.

Also, if just the microparticulation in the gel is to be performed, an additive is not required in particular. However, if the raw material particles are to be dispersed at high uniformity in the gel, a stabilizer or dispersant, such as a water-soluble polymer, surfactant, etc., is preferably added.

Also, with the above-described embodiment, the temperature of the gel body is cooled to a predetermined temperature, preferably a temperature of no more than 0° C. In regard to microparticulation of a substance by laser light illumination, it is known from Non-Patent Document 3 that the higher the microparticle formation efficiency is, the lower the temperature is. Also, in a gel, since the motion of water molecules is confined by the network structure of the gel, the liquid state can be maintained even at a low temperature no more than 0° C.

That is, with microparticulation using a gel body as the to-be-treated body, microparticulation can be carried out upon cooling the raw material particles in the gel to an extremely low temperature. Improved efficiency of microparticulation and lessening of thermal degradation of the formed microparticles can thus be anticipated.

As the cooling means for cooling the gel body, for example, the use of a Peltier element that can cool to approximately −50° C. is preferable. Or, a compressor type cooling device using a normal cooling medium may be used. Also, a means for preventing dew condensation on surfaces of the treatment chamber is preferably provided to execute laser light illumination favorably while cooling the treatment chamber.

With the arrangement shown in FIG. 6, a good optical path for laser light, along which dew condensation does not occur even under low temperature, is maintained by the provision of the dry air insulating layer 137 between the front face of the treatment chamber 103 and the light illumination window 131 and the installation of the dry gas blowing device 134 for the light illumination window 131. Such a cooling means, cooled state maintaining means, dew condensation preventing means, etc., may be installed as necessary.

Also, with the above-described microparticle production method and apparatus, microparticulation by laser light illumination is performed while moving the illumination position of the laser light with respect to the gel body 106 by using the XZ stage 146. The laser light can thereby be illuminated on various positions of the gel body 106 to execute microparticulation by laser light illumination uniformly and efficiently on the substance at the respective positions in the gel body 106. For this movement of the illumination position, the optical path changing device described above in relation to FIG. 1 may be used instead.

Also, with the above-described embodiment, the illumination condition of the laser light onto the to-be-treated body is determined in reference to the result of monitoring the shock wave resulting from the microparticulation of the substance. The laser light illumination conditions can thereby be set favorably to improve the efficiency of microparticulation of the substance.

That is, when a gel body is used as the to-be-treated body, the laser light illumination condition for performing microparticulation is influenced by the properties of the raw material particles, properties of the gel, temperature, additives, etc. It is thus preferable to determine the laser light illumination condition that is actually suitable for a sample to be treated before starting the microparticulation process.

In this case, as a simple method of monitoring the microparticulation phenomenon by laser light illumination, the shock waves generated in accompaniment with the microparticulation are observed as described above. In the arrangement shown in FIG. 6, the microphone 121 is placed in contact with the side face of the treatment chamber 103 and good laser light illumination conditions are determined from the results of analyzing the waveforms of the shock waves observed in synchronization with the laser light illumination.

As another merit of performing microparticulation of the substance using a gel body, separation, classification, or enrichment of the formed microparticles can be performed by providing an electric field applying means for the gel body and applying an electric field in the gel body to perform electrophoreses in combination. By using electrophoresis, a Coulombic force can be made to act on charged particles in the gel by electric field application in the gel and just the particles of particle diameters that enable passage through the network of the gel can be moved.

In general, it is preferable to apply the electric field in the gel body by the electric field applying means to perform at least one of separation, classification, and enrichment of the microparticles. If the formed microparticles themselves are not charged, the microparticles can be provided with charges by adding an ionic additive. In this case, because the ionic additive becomes attached to the peripheries of the formed microparticles, electrophoresis of the microparticles can be realized satisfactorily. In a case where the substance to be microparticulated is a medicament, etc., the additive is preferably selected from among those allowed for the medicament.

Figure 9:
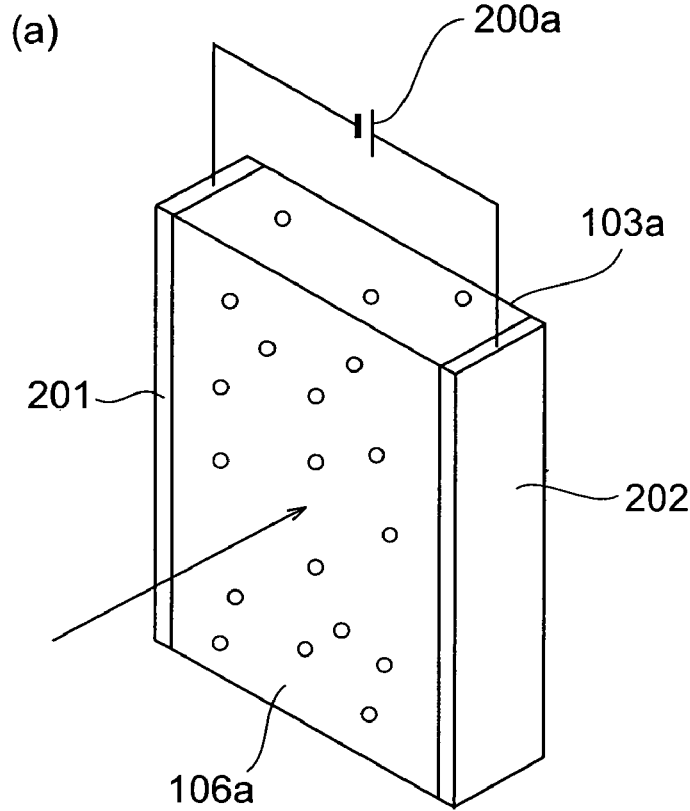
Figure 9:
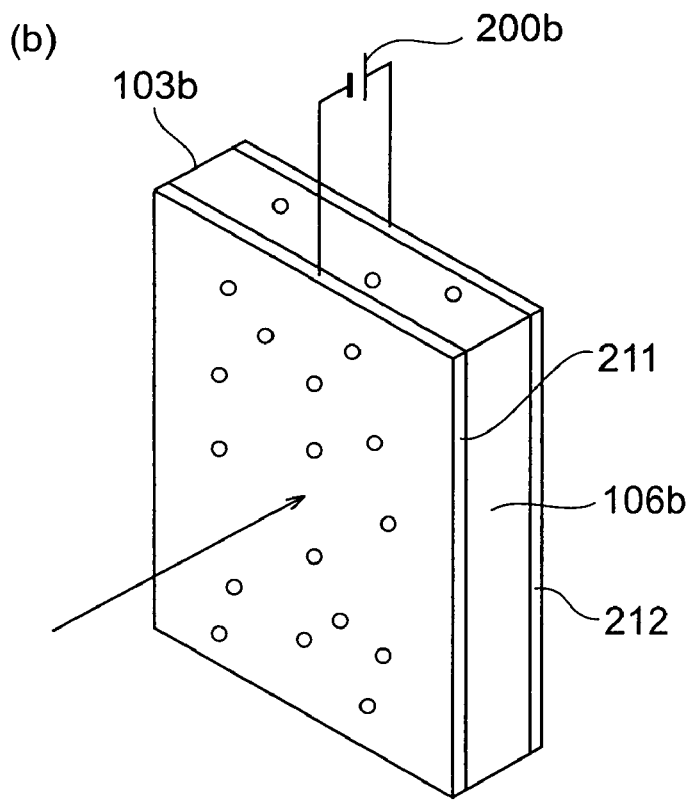

FIG. 9 shows diagrams of configurations of electrodes that make up an electric field applying means for a gel body. Both of the arrangement examples (a) and (b) shown in FIG. 9 are arranged as a treatment chamber with electrodes, with which an electrophoresis function is added to the treatment chamber 103.

The arrangement example (a) is that of a case of performing electrophoresis of the microparticles in a direction perpendicular to the laser light illumination axis. With this treatment chamber 103*a*, electrophoresis electrodes 201 and 202 are positioned so as to sandwich a gel body 106*a*, which is to be treated, from the left and right.

With this arrangement, the electrophoresis of the microparticles in the gel body 106*a* is performed by applying a DC voltage from an electrophoresis power supply 200*a* between electrodes 201 and 202. With the arrangement shown in (a) of FIG. 9, microparticles, having particle diameters that enable movement in the network structure of the gel body 106*a* and being charged, move to the left side if charged positively and to the right side if charged negatively.

The arrangement example (b) is that of a case of performing electrophoresis of the microparticles in the same direction as the laser light illumination axis. With this treatment chamber 103*b*, electrophoresis electrodes 211 and 212 are positioned so as to sandwich a gel body 106*b*, which is to be treated, from the front and rear. In this arrangement, transparent electrodes must be used since the laser light is illuminated onto the electrodes themselves.

With this arrangement, the electrophoresis of the microparticles in the gel body 106*b* is performed by applying a DC voltage from an electrophoresis power supply 200*b* between electrodes 211 and 212. With the arrangement shown in (b) of FIG. 9, microparticles, having particle diameters that enable movement in the network structure of the gel body 106*b* and being charged, move to the front if charged positively and to the rear if charged negatively.

With the arrangements (a) and (b) shown in FIG. 9, an operation of separating just the formed microparticles from the laser light illumination region by electrophoresis can be performed while performing the microparticulation of the substance by laser light illumination. Such an operation contributes significantly to the improvement of the treatment efficiency by avoidance of more laser light illumination than necessary on the formed microparticles and illumination of laser light only on particles of large particle diameters that are to be microparticulated.

Also, since the higher the moving speed in the gel is, the smaller the particle diameter of the microparticle is in comparison to the network size of the gel, classification of the formed microparticles, that is, separation according to particle diameter can also be realized by electrophoresis. Furthermore, by performing the electrophoresis treatment over a long time, an enrichment operation of increasing the density of formed microparticles near the electrophoresis electrodes can be realized.

Also, with the method of performing microparticulation of a substance using a gel body, in the microparticulating step, the gel body may be connected to a second gel body that does not contain the substance to be microparticulated and the microparticles formed in the gel body for microparticulation may be moved and stored into the second gel body by electrophoresis. By using such a method, the second gel body, in which raw material particles are not mixed, can be used as a recovery gel body for recovering just the formed microparticles.

Figure 10:
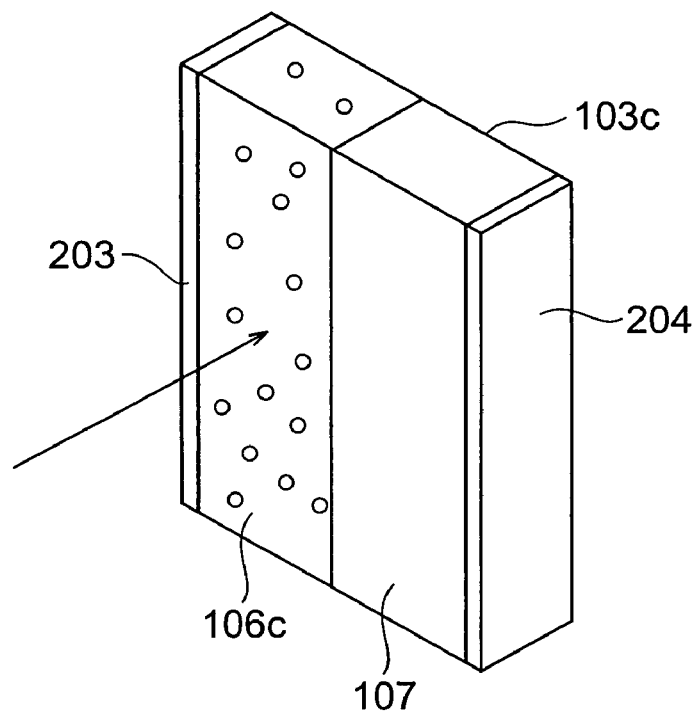
Figure 10:
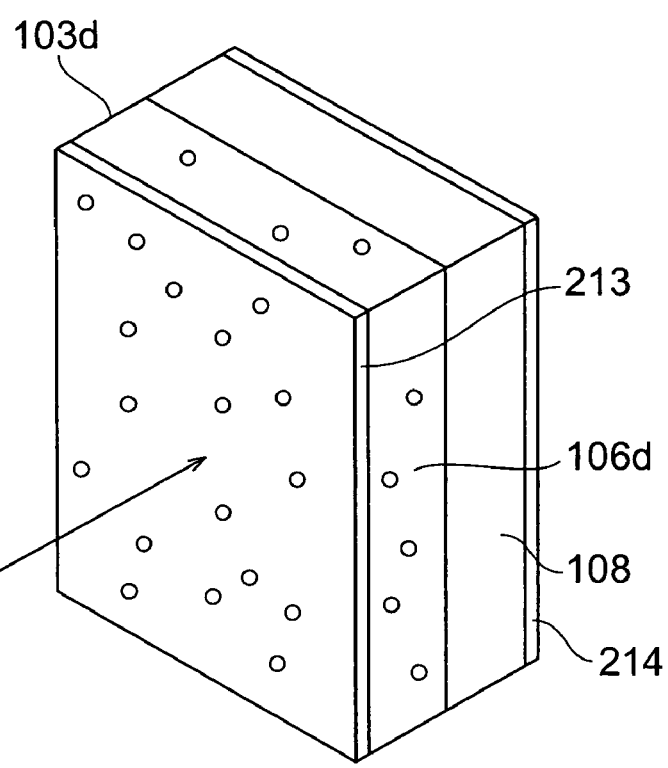

FIG. 10 shows diagrams of configurations of a treatment gel body and a recovery gel body. As with the arrangement examples (a) and (b) shown in FIG. 9, both of the arrangement examples (a) and (b) shown in FIG. 10 are arranged as a treatment chamber with electrodes, with which an electrophoresis function is added to the treatment chamber 103.

With the arrangement example (a), electrophoresis electrodes 203 and 204 are positioned so as to sandwich a gel body from the left and right in a treatment chamber 103c. In correspondence with such an electrode arrangement, a treatment gel body 106c, in which the raw material particles of the substance to be microparticulated are dispersed and fixed, is positioned at the left side (electrode 203 side) of the treatment chamber 103c, and a recovery gel body 107, for recovering just the formed microparticles, is positioned at the right side (electrode 204 side) of the treatment chamber 103c.

With arrangement example (b), electrophoresis electrodes 213 and 214 are positioned so as to sandwich a gel body from the front and rear in a treatment chamber 103d. In correspondence with such an electrode arrangement, a treatment gel body 106d is positioned at the front side (electrode 213 side) of the treatment chamber 103d, and a recovery gel body 108 is positioned at the rear side (electrode 214 side) of the treatment chamber 103d.

In each of these arrangements, when a DC voltage is applied between the electrophoresis electrodes, the formed microparticles, which have particle diameters enabling movement in the network structure of the treatment gel body and are charged, move to and are recovered and stored in the recovery gel body by electrophoresis.

As a method of preparing a connected gel body in which a treatment gel body and a recovery gel body are connected in the above manner, the orientation of the treatment chamber is changed so that the portion, at which the treatment gel body that contains the raw material particles is to be formed, is positioned at the bottom side. A lid is then placed on just an upper portion of the treatment gel body portion and the to-be-treated liquid, containing the raw material particles, is poured in to form the treatment gel body. By thereafter pouring a solution of the recovery gel body, which does not contain the raw material particles, into the remaining space inside the treatment chamber, the connected gel body is completed. Or, if just the recovery gel body is to be recovered, the treatment gel body and the recovery gel body are prepared in separate containers and thereafter positioned in a contacting state inside the treatment chamber.

Although details of the present invention shall now be described more specifically by way of an example, the present invention is not limited to the following example.

First, a first example of microparticulation using a gel body shall be described. In this example, microparticulation of the blue pigment, VOPc (vanadyl phthalocyanine), as the substance to be microparticulated, was attempted. Agarose gel was used as the gel and microparticulation was performed in the gel.

To water, which is the solvent, 1% of agarose powder, which is the gel raw material, and 0.5% of SDS (sodium dodecyl sulfate), which is an anionic surfactant, were mixed, and the solution obtained was heated to 90° C. and a gel solution was obtained. In the step of cooling the gel solution, VOPc, which is to be microparticulated, was mixed to a concentration of 0.5 mg/ml into the gel solution and dispersed in the solution when the temperature was 45° C. to prepare the to-be-treated liquid, and thereafter, the to-be-treated liquid was gelled in a cylindrical, glass Petri dish, which is the treatment chamber, to form a gel body that is the to-be-treated body.

Figure 11:
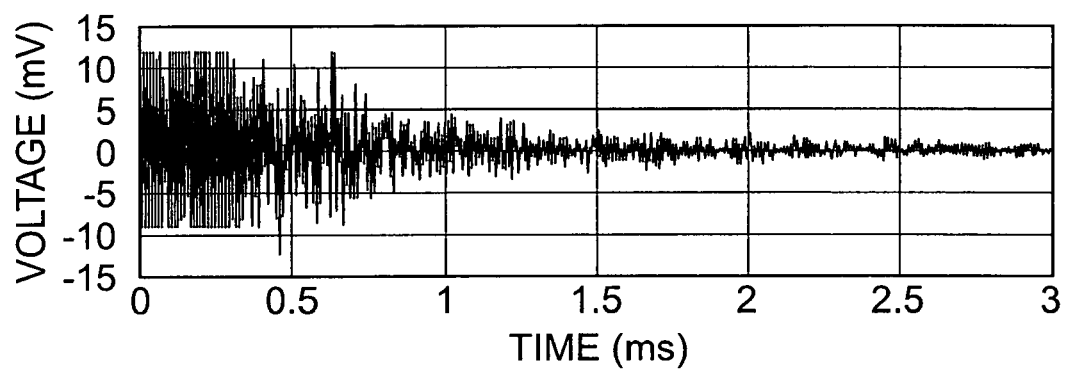

The laser light illumination condition for performing microparticulation of VOPc in the gel body was then examined by monitoring the amplitudes of shock waves observed during laser light illumination. FIG. 11 is a graph of results of monitoring shock waves due to microparticulation of the substance in the gel body. In this graph, the abscissa indicates the time (ms) and the ordinate indicates the output voltage (mV) from the microphone that is the shock wave monitoring means. Here, by illuminating a YAG pulse laser light of 1064 nm wavelength onto the gel body, shock waves of the time waveform shown in FIG. 11 were observed.

Figure 12:
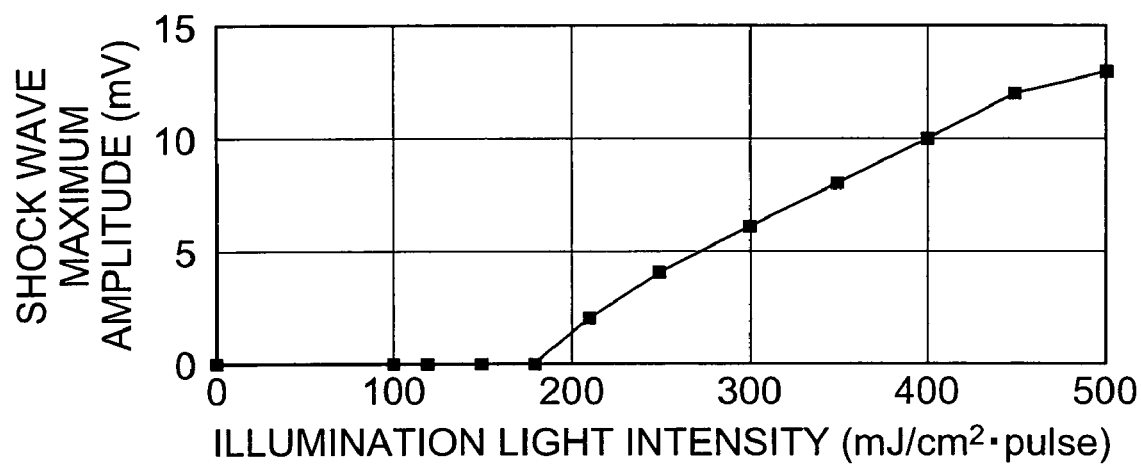

FIG. 12 is a graph of the correlation between the intensity of the laser light illuminated onto the gel body and the shock wave maximum amplitude observed. In this graph, the abscissa indicates the illumination light intensity (mJ/$cm^2$·pulse) and the ordinate indicates the shock wave maximum amplitude (mV). This graph shows that the VOPc in the gel body is microparticulated by illuminating laser light of an intensity of no less than 180 mJ/$cm^2$·pulse. By referencing such shock wave monitoring results, the conditions of illumination of the laser light onto the gel body that is the to-be-treated body can be set favorably.

Figure 13:
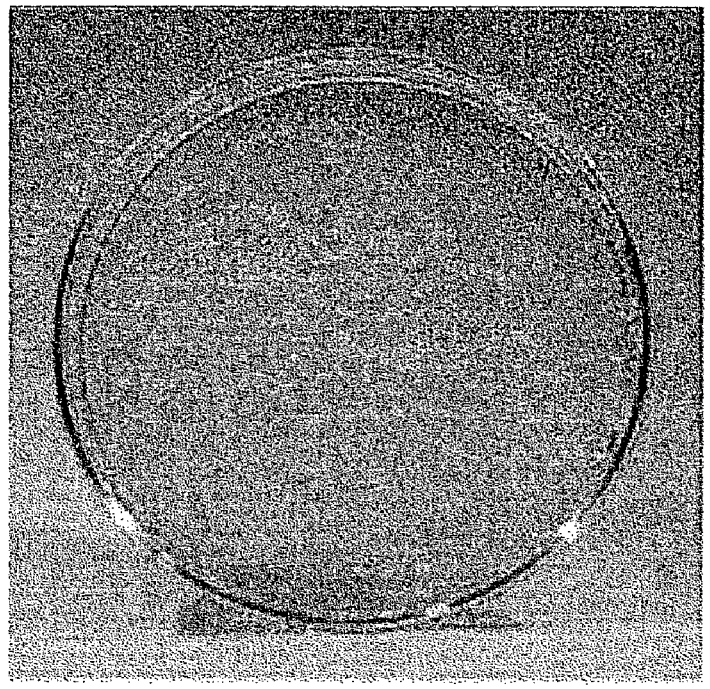
Figure 13:
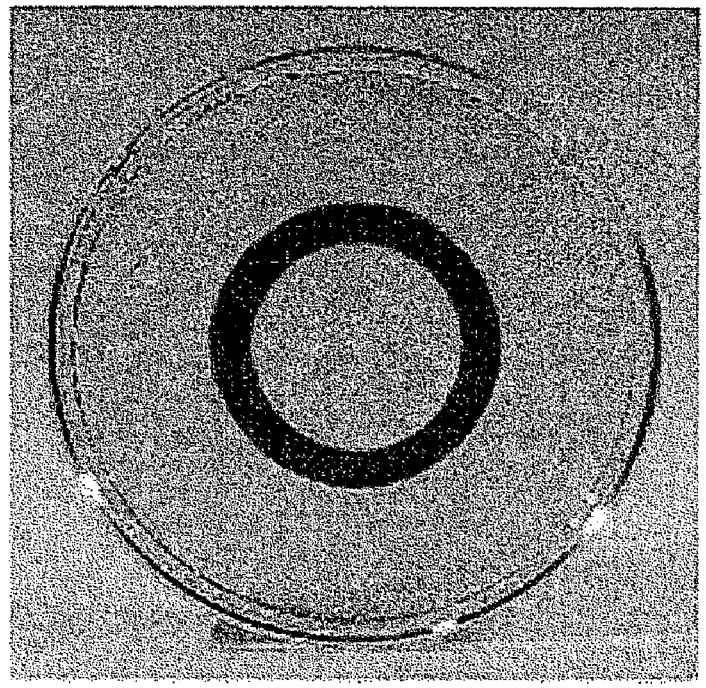

FIG. 13 shows diagrams of states of the gel body, containing VOPc, before and after microparticulation, a state (a) shows the state before microparticulation and a state (b) shows the state after microparticulation. Here, by setting the intensity of illumination of the laser light onto the gel body in the Petri dish to 450 mJ/$cm^2$·pulse and fixing the illumination position while rotating just the cylindrical Petri dish, microparticulation of the VOPc in the gel body was performed in a circular region.

As can be understood from the states (a) and (b) of FIG. 13, in the gel body after microparticulation, the inherent blue color of VOPc is seen in the circular region illuminated by the laser light. According to Patent Document 1 and Non-Patent Documents 1 to 3, VOPc, although being insoluble, exhibits the color inherent to the pigment when microparticulation to several dozen to several hundred nm is achieved. That the laser light illuminated region appears blue in the state (b) indicates that the raw material particles of VOPc were microparticulated in this region.

Figure 14:
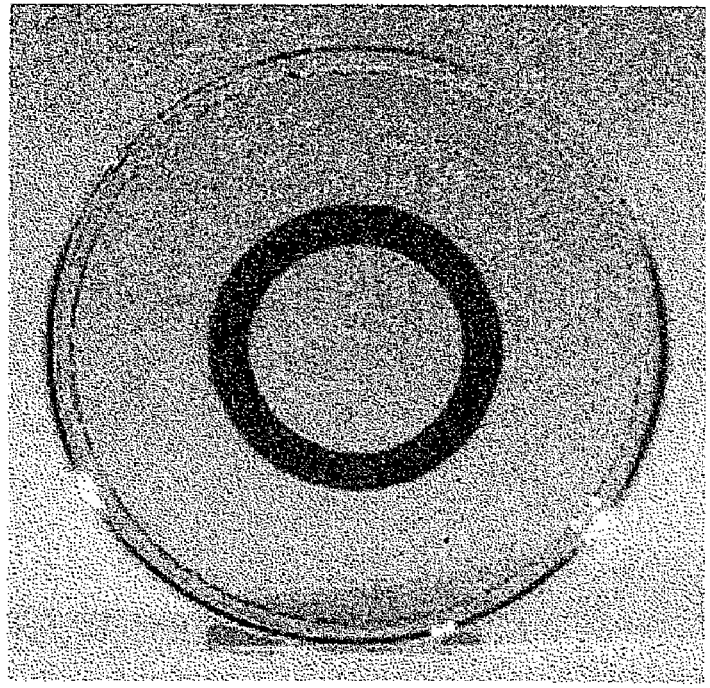
Figure 14:
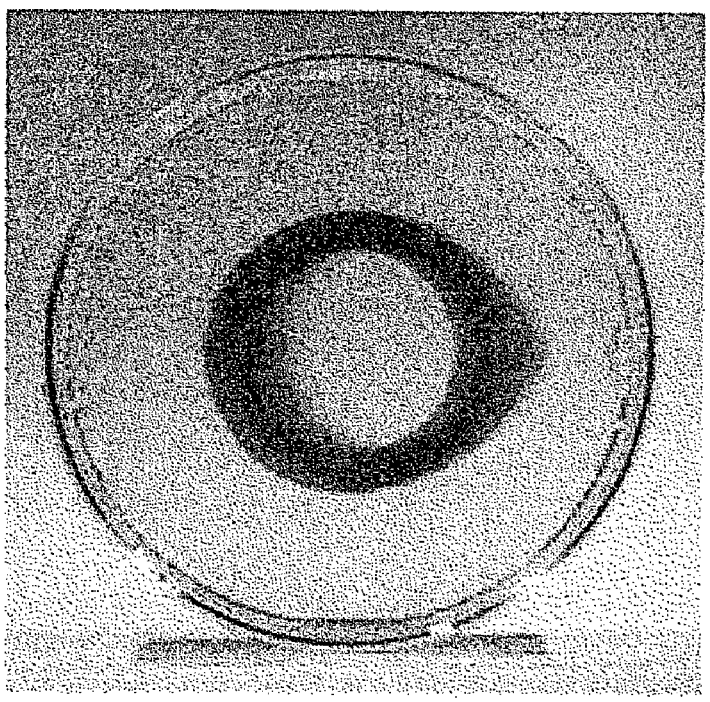

Electrodes were then positioned at respective ends of a straight line passing through the center of the cylindrical Petri dish of 7 cm diameter so as to sandwich the Petri dish from the left and right, and electrophoresis of the formed microparticles was performed by applying a DC voltage of 12V to the gel body in the Petri dish. FIG. 14 shows diagrams of states of the gel body, containing formed microparticles of VOPc, before and after electrophoresis, a state (a) shows the state before electrophoresis and a state (b) shows the state after electrophoresis.

In the state (a) of FIG. 14, the shape of the circular region corresponding to the above-described laser light illumination region appears clearly. In contrast, the state (b) shows that in the state after 20 minutes of electrophoresis, the blue portion that was in the circular region has shifted to the right. This is considered to be due to the formed microparticles being charged negatively by the anionic SDS that was added to the solution and just the microparticles of sizes enabling movement in the gel being moved to the right side by electrophoresis. As described above, such movement of the formed microparticles by combination of an ionic surfactant and electrophoresis is effective for an operation of separating, classifying, or enriching, etc., the microparticles and enables microparticles of high quality to be supplied.

A second example of microparticulation using a gel body shall now be described. In this example, microparticulation was attempted with the poorly soluble medicament, clobetasone butyrate (a synthetic topical corticosteroid), as the substance to be microparticulated. The microparticulation conditions are the same as those of the first example.

Figure 15:
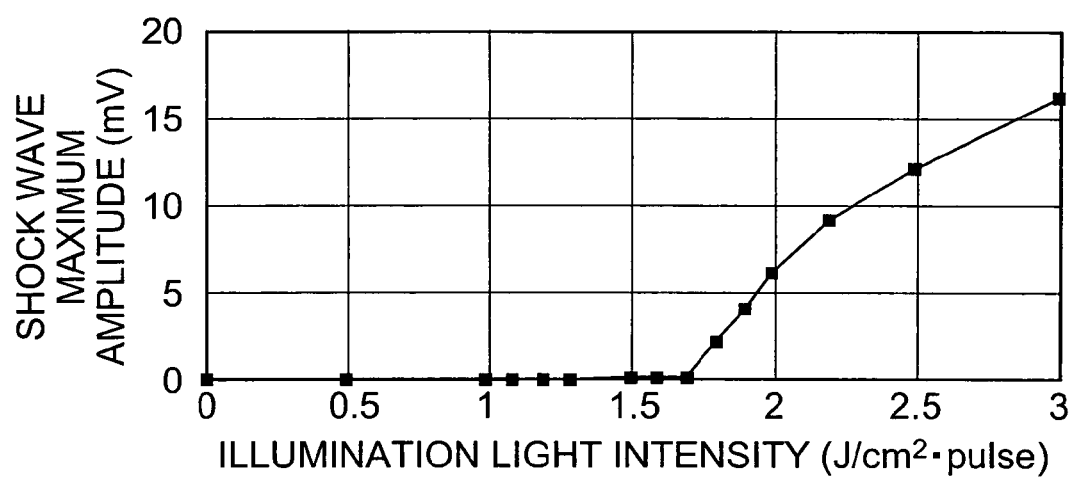

FIG. 15 is a graph of the correlation between the intensity of the laser light illuminated onto the gel body and the shock wave maximum amplitude observed. In this graph, the abscissa indicates the illumination light intensity ($J/cm^2$·pulse) and the ordinate indicates the shock wave maximum amplitude (mV). This graph shows that with the present example in which clobetasone butyrate is to be microparticulated, the clobetasone butyrate in the gel body is microparticulated by illuminating laser light of an intensity of no less than 1.7 $J/cm^2$·pulse.

The microparticle production method and production apparatus and the microparticles according to the present invention are not limited to the above-described embodiments and examples, and various modifications are possible. For example, the material of the treatment chamber used in the production apparatus is not limited to quartz, and various materials may be used in consideration of the laser light transmission characteristics, etc. Also, in regard to the thermally insulating layer disposed on the periphery of the treatment chamber, a material besides styrene foam may be used. In regard to the solidified state maintaining means that maintains the solvent in the solidified state in the solidified body or the cooled state maintaining means that maintains the gel body in the cooled state, various arrangements may be used besides the thermally insulating layer. Also, as the solid to-be-treated body, a to-be-treated body, containing raw material particles of a substance to be microparticulated in a dispersed and fixed state, in general may be used besides a solidified body or a gel body.

INDUSTRIAL APPLICABILITY

The present invention can be used as a microparticle production method and production apparatus that enable organic compounds to be microparticulated efficiently, and as microparticles.

The invention claimed is:

1. A microparticle production method of photo-pulverizing a substance in a solvent of a to-be-treated liquid to produce microparticles of the substance,
the microparticle production method comprising: a microparticulating step of using a to-be-treated body, which contains the substance and with which the solvent of the to-be-treated liquid is made solid, and illuminating a laser light of a predetermined wavelength onto the to-be-treated body to microparticulate the substance in the solvent.

2. The production method according to claim 1, wherein the wavelength of the laser light used in the microparticulating step is not less than 900 nm.

3. The production method according to claim 1, wherein in the microparticulating step, the laser light illumination is performed while moving an illumination position of the laser light onto the to-be-treated body.

4. The production method according to claim 3, wherein in the microparticulating step, the illumination position is moved by changing an optical path of the laser light.

5. The production method according to claim 1, wherein in the microparticulating step, a result of monitoring a shock wave resulting from the microparticulation of the substance is referenced to determine an illumination condition of the laser light onto the to-be-treated body.

6. The production method according to claim 1, wherein the substance is a medicament.

7. The production method according to claim 1, wherein in the microparticulating step, a solidified body, which is the to-be-treated body containing the substance and with which the solvent is solidified by cooling the to-be-treated liquid, is used, and the substance in the solvent is microparticulated by illuminating the laser light onto the solidified body.

8. The production method according to claim 7, further comprising: a gas eliminating step of eliminating a dissolved gas in the solvent before solidifying the solvent.

9. The production method according to claim 7, further comprising: a particle dispersing step of dispersing raw material particles of the substance in the solvent before solidifying the solvent.

10. The production method according to claim 1, wherein in the microparticulating step, a gel raw material is dispersed in the solvent of the to-be-treated liquid, a gel body, which is the to-be-treated body containing the substance and with which the solvent, containing the gel raw material, is gelled, is used, and the laser light is illuminated onto the gel body to microparticulate the substance in the solvent.

11. The production method according to claim 10, wherein an external-environment responsive type gel raw material is used as the gel raw material.

12. The production method according to claim 10, wherein in the microparticulating step, an electric field is applied inside the gel body to perform at least one of separation, classification, and enrichment of the microparticles.

13. The production method according to claim 10, wherein in the microparticulating step, a second gel body that does not contain the substance is connected to the gel body and the microparticles formed in the gel body are moved and stored into the second gel body by electrophoresis.

14. The production method according to claim 10, wherein in the microparticulating step, the temperature of the gel body is cooled.

* * * * *